(12) United States Patent
Khe et al.

(10) Patent No.: US 9,460,827 B2
(45) Date of Patent: Oct. 4, 2016

(54) PHYSICALLY FUNCTIONALIZED GRAPHENE HYBRID COMPOSITE (GHC) AND ITS APPLICATIONS

(71) Applicant: DHKGraphenologies LLC, San Jose, CA (US)

(72) Inventors: Nguyen C. Khe, Ho Chi Minh (VN); Hieu Dinh, San Jose, CA (US); Dien Dinh, San Jose, CA (US)

(*) Notice: Subject to any disclaimer, the term of this patent is extended or adjusted under 35 U.S.C. 154(b) by 426 days.

(21) Appl. No.: 14/047,991

(22) Filed: Oct. 7, 2013

(65) Prior Publication Data

US 2015/0099214 A1    Apr. 9, 2015

(51) Int. Cl.
| | |
|---|---|
| *H01B 1/24* | (2006.01) |
| *H01B 1/04* | (2006.01) |
| *H01B 1/08* | (2006.01) |
| *H01B 1/18* | (2006.01) |
| *H01M 4/96* | (2006.01) |

(52) U.S. Cl.
CPC ........ *H01B 1/24* (2013.01); *H01B 1/04* (2013.01); *H01B 1/08* (2013.01); *H01B 1/18* (2013.01); *H01M 4/96* (2013.01); *Y10T 428/268* (2015.01); *Y10T 428/2982* (2015.01)

(58) Field of Classification Search
None
See application file for complete search history.

(56) References Cited

U.S. PATENT DOCUMENTS

| | | | |
|---|---|---|---|
| 2012/0104327 A1* | 5/2012 | Kim | B82Y 30/00 252/507 |
| 2012/0321953 A1* | 12/2012 | Chen | B82Y 30/00 429/219 |
| 2014/0234200 A1* | 8/2014 | Tour | C01B 31/0446 423/448 |

* cited by examiner

*Primary Examiner* — Alix Eggerding
(74) *Attorney, Agent, or Firm* — Dale R. Jensen; Dale Jensen, PLC

(57) ABSTRACT

Certain exemplary embodiments can provide a graphene hybrid composite (GHC). The GHC can be formed between specific nano carbon materials and graphene generated via pyrolysis of solid carbon sources. A Raman spectrum of the GHC can show a major 2D band at approximately 2650 $cm^{-1}$, a minor D and G band at approximately 1350 $cm^{-1}$ and approximately 1575 $cm^{-1}$, and an intensity ratio of 2D band over D band and G band greater than 1.

20 Claims, 30 Drawing Sheets

14000

| sample ID | ρ | Product | Process | Properties |
|---|---|---|---|---|
| 200407-90-7041 (1) | 0.033 | unpurified GHC | original product of pyrolysis | poor dispersion |
| 200407-90-7041 (2) | 0.024 | purified GHC grade 1 | acid wash | poor dispersion |
| 200407-90-7041 (3) | 0.021 | purified GHC grade 2 | alkaline wash | poor dispersion |
| 200407-90-7041 (4) | 0.022 | functionalized GHC grade 1 | oxidation | marginal dispersion |
| 200407-90-7041 (5) | 0.026 | functionalized GHC grade 4 | surface modification with -SO3H | better dispersion |
| 200407-90-7041 (6) | 0.048 | functionalized GHC grade 5 | surface modification with -COOH | best dispersion |
| Pure MWNT | 0.098 | commercial | Non treated | poor dispersion |
| Pure SWNT | 0.073 | commercial | Non treated | poor dispersion |
| Pure graphene nano platelet | 0.055 | commercial | Non treated | poor dispersion |

PHYSICALLY FUNCTIONALIZED GRAPHENE HYBRID COMPOSITE (GHC) AND ITS APPLICATIONS

CROSS-REFERENCES TO RELATED APPLICATIONS

This application is related to pending U.S. patent application Ser. No. 13/290,108, filed 7 Nov. 2011.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 14 is a table 14000 of properties of various exemplary embodiments of graphene hybrid composites ("GHC");

DETAILED DESCRIPTION

Certain exemplary embodiments can provide a graphene hybrid composite (GHC). The GHC can be formed between specific nano carbon materials and graphene generated via pyrolysis of solid carbon sources. A Raman spectrum of the GHC can show a major 2D band at approximately 2650 $cm^{-1}$, a minor D and G band at approximately 1350 $cm^{-1}$ and approximately 1575 $cm^{-1}$, and an intensity ratio of 2D band over D band and G band greater than 1.

Carbon can have four unique crystalline structures comprising diamond, graphite, fullerene, and carbon nano-tubes. Carbon can form many products having different physical structure. The one related to the present invention can be classified as following:

Carbon nano tube. The phrase "carbon nano-tube" ("CNT") refers to a tubular structure, which can be grown with a single wall or multi-walls. A CNT can be conceptually visualized as rolling up a graphene sheet or several graphene sheets to form a concentric hollow structure. CNTs have a diameter on the order of a few nanometers to a few hundred nanometers.

Graphite is a crystalline, low density and soft allotrope of carbon. The crystalline structure of graphite consists of hexagonal rings forming thin parallelplates. Graphite has a layered, substantially planar structure. In each layer, the carbon atoms are arranged in a hexagonal lattice with separation of approximately 0.142 nanometers ("nm"), and the distance between planes is approximately 0.335 nm and the layers from each planes layers are bonded to each other by weak Van der Waals forces. Two forms of graphite, alpha (hexagonal) and beta (rhombohedral), have very similar physical properties (except that the graphene layers stack slightly differently). The hexagonal graphite can be either flat or buckled. The alpha form can be converted to the beta form through mechanical treatment and the beta form can revert to the alpha form when it is heated above approximately 1300° Celsius. The layering contributes to its relatively low density.

Graphene A lot of efforts had been made to isolate layers in graphite into single layer product which is called graphene. In reality, there is a pure graphene product having single layer structure which had successfully been made showing superior electronic and mechanical properties. There is also bilayer structure product, a few layer structure products called graphene nano platelet.

Figure 1:
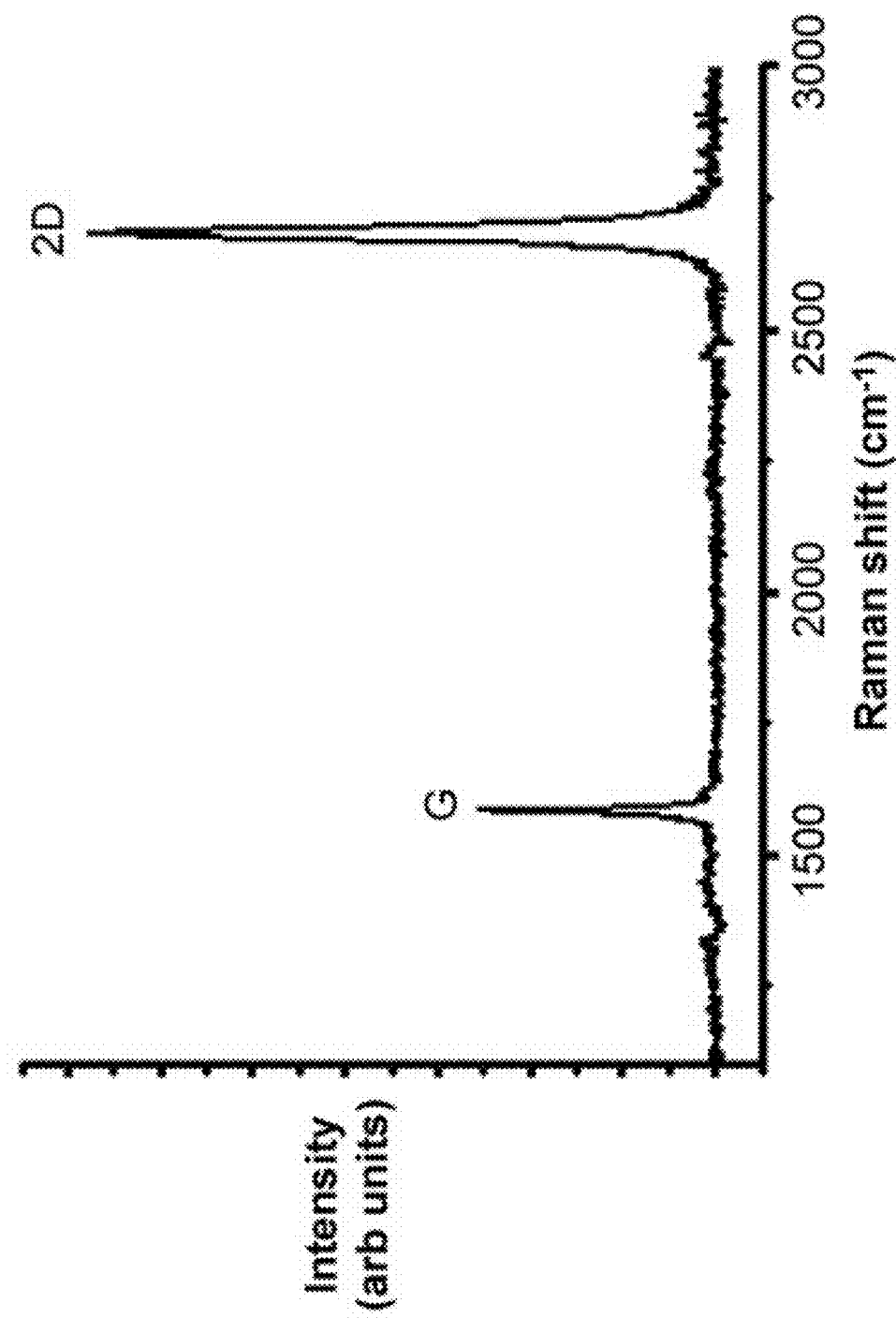
FIG. 1 is a graph 1000 of a Raman spectra of graphene having substantially a single layer structure.
Figure 2:
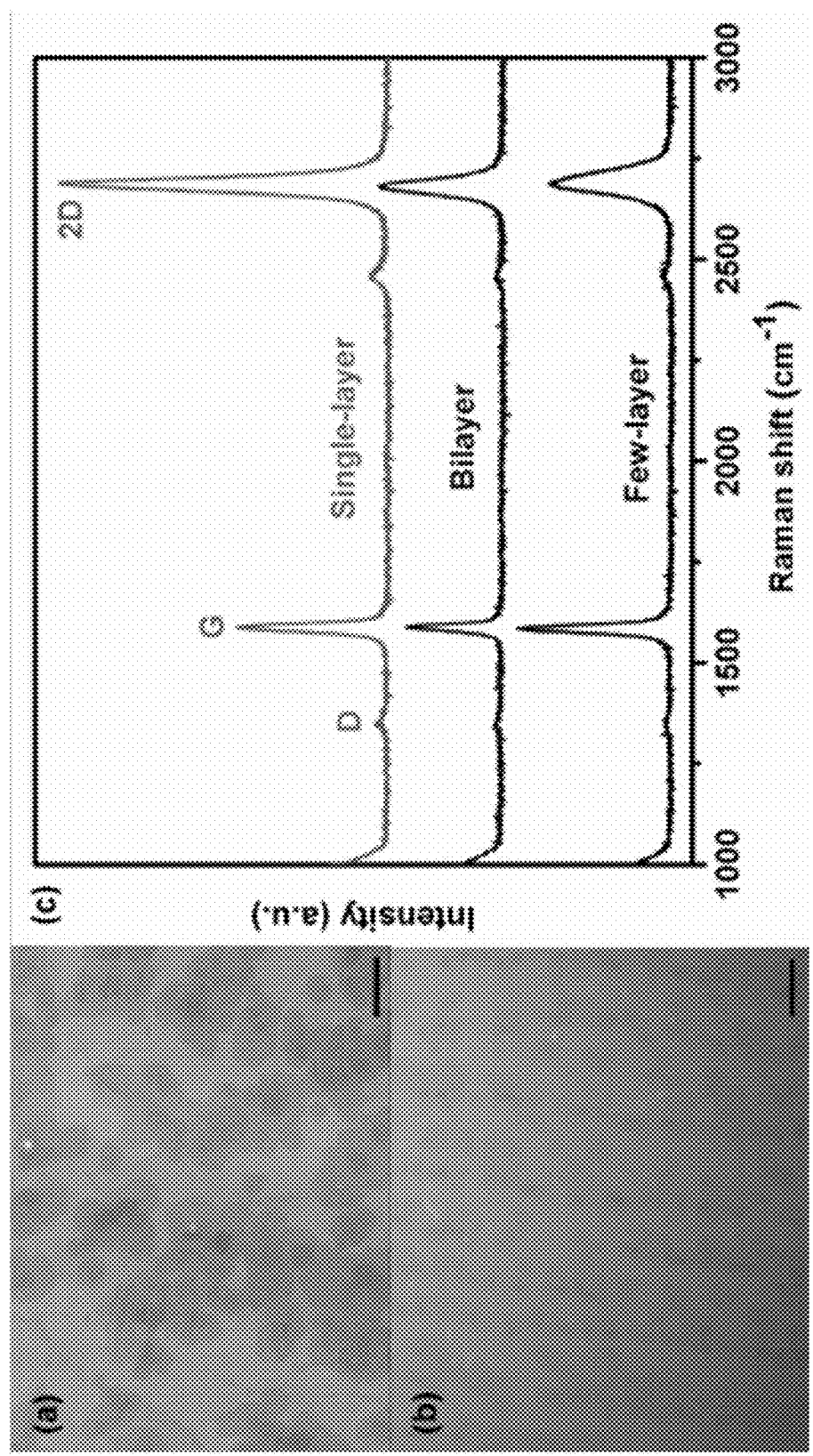
FIG. 2 is a graph 2000 of a Raman spectra of graphene having more than substantially one layer; substantially bi-layer, and a few-layers.
Figure 3:
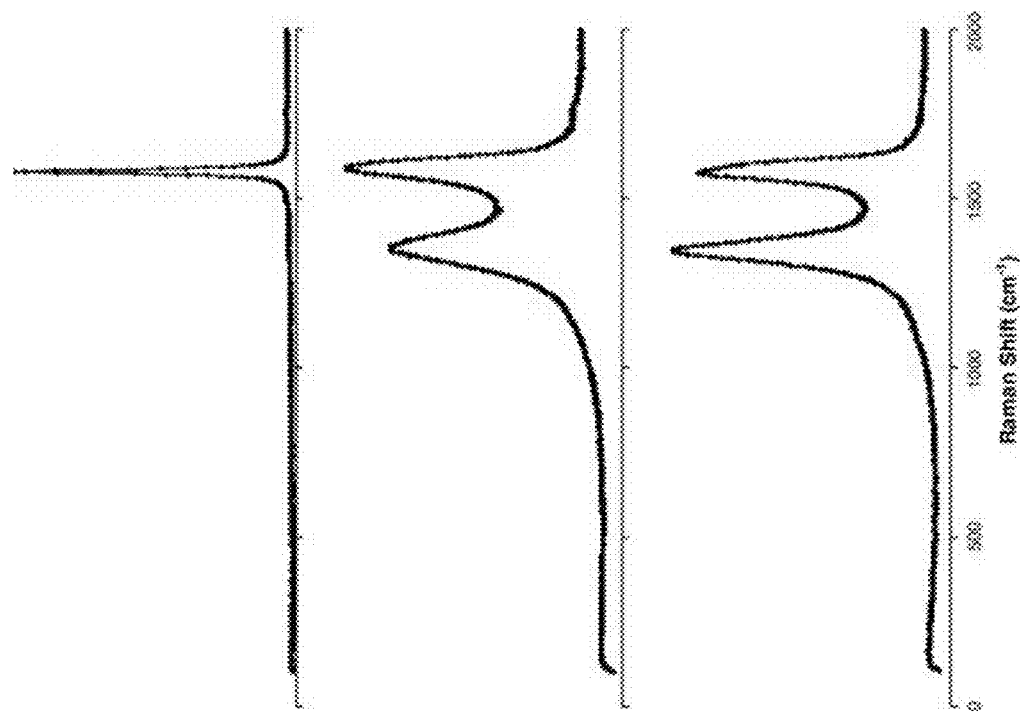
FIG. 3 is a graph 3000 of a Raman spectra of graphite and graphene oxide ("GO")

Generally speaking, so far, Raman spectroscopy is possibly the best way to identify each kind of graphitic carbon materials including graphite, graphene, graphite and graphene oxide, carbon nano tube, fullerene, diamond. For reference, FIG. 1 exhibits a Raman spectroscopy chart of graphene, which shows a small G band at approximately 1582 $cm^{-1}$ and a relatively large 2D band (also named "G") at approximately 2640 $cm^{-1}$. FIG. 2 illustrates a Raman spectroscopy chart of graphene having different layer counts in the structure. In the structure having more and more layers, the G band grows larger and larger; such as the case for bi-layer and few layer systems. FIG. 3 shows Raman spectroscopy for graphite and graphene oxide; grade graphite (top), graphene oxide (middle), and reduced graphene oxide (bottom).

Graphene is a crystalline form of carbon, as are diamond, graphite, carbon nanotubes and fullerenes. In graphene, carbon atoms are arranged in a substantially regular hexagonal pattern. Graphene can be described as a one-atom thick layer of the layered mineral graphite. Graphene is an allotrope of carbon, whose structure is substantially one-atom-thick planar sheets of sp-bonded carbon atoms that are packed in a honeycomb crystal lattice. Graphene can be visualized as an atomic-scale sheet made of carbon atoms and their bonds. The crystalline or "flake" form of graphite consists of many graphene sheets stacked together. In essence, graphene is an isolated atomic plane of graphite.

Graphite Oxide, Graphene Oxide and Graphene.

While graphite is a three dimensional carbon based material made up of millions of layers of graphene, graphite oxide ("GO") is a little different. In GO each carbon layer is separated with oxygen molecules, which not only expand the layer separation, but also enable the layers to become hydrophilic (meaning that they can be dissolved in water, much like sugar or salt). This property enables GO to be exfoliated in water using sonication, ultimately producing single or few layer graphene, known as graphene oxide. To summarize, graphene oxide is graphite that has been oxidized to intersperse the carbon layers with oxygen molecules, and then reduced, to separate the carbon layers into graphene having one or a few layers.

Sometimes graphene oxide is mistakenly referred to as GO, which actually is the chemical formula for graphite oxide. However, r-GO is a chemical formula for reduced graphite oxide, which is effectively graphene oxide. Reducing graphene oxide to produce graphene monolayers can be challenging. While it is possible to reduce graphene oxide to graphene by using hydrazine hydrate, hydrazine hydrate is relatively strong and poisonous. Also, the reduction of graphene oxide using hydrazine hydrate may still contain some impurities such as oxygen or even nitrogen, due to the reaction between the GO and hydrazine hydrate. Sodium borohydride can be a potential replacement for hydrazine hydrate and can result in better yields.

Graphene can be produced using mechanical or thermal exfoliation, chemical vapor deposition (CVD), and/or epitaxial growth, etc. Graphene can also be produced via chemical reduction. Graphite oxide can be produced by combining graphite with an oxidizing agent such as one or more of sodium nitrate, potassium permanganate and sulphuric acid.

Exfoliated graphene can be obtained via micro-mechanical alleviation of graphite. Adhesive tape can be applied repeatedly to split graphite crystals into increasingly thinner pieces. Tape with attached optically transparent flakes can be dissolved in acetone, and, after a few further steps, the flakes including monolayers can be sedimented on a silicon wafer. Individual atomic planes can be examined with an optical microscope. Certain exemplary embodiments can utilize substantially dry deposition, avoiding a stage when graphene floated in a liquid. Relatively large crystallites (first, only a few micrometers in size but eventually larger than 1 mm and visible to the naked eye) can be obtained thereby. Such a technique can be referred to as a scotch tape or drawing method. The latter name can be used because the dry deposition resembles drawing with a piece of graphite the key for the success might be the use of relatively high-throughput visual recognition of graphene on a selected substrate, which can provide a small but noticeable optical contrast.

Epitaxial Growth on Silicon Carbide.

Another method of obtaining graphene is to heat silicon carbide (SiC) to relatively high temperatures (greater than approximately 1,100° Celsius) under relatively low pressures (approximately $10^{-6}$ torr) to reduce the SiC to graphene. Such a process produces epitaxial graphene with dimensions dependent upon the size of the SiC substrate (wafer). The face of the SiC used for graphene formation, silicon- or carbon-terminated, highly influences the thickness, mobility and carrier density of the graphene.

Epitaxial Growth on Metal Substrates.

This method uses source and the atomic structure of a metal substrate to seed the growth of the graphene (epitaxial growth). Due to the long-range order of these ripples, generation of mini-gaps in the electronic band-structure (Dirac cone) becomes visible. High-quality sheets of few-layer graphene exceeding approximately one square centimeter (approximately 0.2 square inches) in area have been synthesized via chemical vapor deposition on thin nickel films with methane as a carbon source. These sheets can be transferred to various substrates, demonstrating viability for numerous electronic applications.

Certain exemplary embodiments employ copper foil; at very low pressure, the growth of graphene automatically stops after a single graphene layer forms, and relatively large graphene films can be created. The aforementioned single layer growth is also due to the low concentration of carbon in methane. Higher molecular weight hydrocarbon gasses, such as ethane and propane, will lead to the growth of bilayer graphene. At atmospheric-pressure CVD growth, multilayer graphene can also form on copper (similar to that grown on nickel films). Growth of graphene can be demonstrated at temperatures compatible with conventional CMOS processing, using a nickel-based alloy with gold as a catalyst.

Graphite Oxide Reduction.

Graphite oxide reduction can yield substantially mono layer flakes of reduced graphene oxide. Graphite oxide exfoliation can be achieved by rapid heating and yields highly dispersed carbon powder with a few percent of graphene flakes. Reduction of graphite oxide monolayer films e.g. by hydrazine, annealing in argon/hydrogen can yield graphene films. However, the quality of graphene produced by graphite oxide reduction can be lower compared to, for example, scotch-tape graphene due to incomplete removal of various functional groups by existing reduction methods. Furthermore, the oxidation protocol can introduce defects due to over-oxidation. The oxidation protocol can be enhanced to yield graphene oxide with an almost intact carbon framework that allows the highly efficient removal of functional groups. The measured mobility of charge carriers can exceed approximately 1000 square centimeters/Volt·seconds for good quality flakes. Applying a layer of graphite oxide film to a DVD disc and burning it in a DVD writer can result in a thin graphene film with a relatively high electrical conductivity (approximately 1738 siemens per meter) and specific surface area (approximately 1520 square meters per gram), besides being highly resistant and malleable.

Growth from Metal-Carbon Melts.

In certain exemplary embodiments, carbon atoms can be dissolved inside a transition metal melt at a certain temperature, and then the dissolved carbon can be allowed to precipitate out at lower temperatures as single layer graphene (SLG). The metal can be first melted in contact with a carbon source. The carbon could be the graphite crucible inside which the melting process is carried out or it could be a graphite powder or chunk sources, which are simply placed in contact with the melt. Keeping the melt in contact with carbon source at a given temperature will give rise to substantial dissolution and saturation of carbon atoms in the melt based on the binary phase diagram of metal-carbon. Upon lowering the temperature, solubility of the carbon in the molten metal will decrease and the excess amount of carbon will precipitate on top of the melt. The floating layer can be either skimmed or allowed to freeze for removal afterwards. Different morphology including thick graphite, few layer graphene (FLG) and SLG were observed on metal substrate. Raman spectroscopy proves that SLG can be successfully grown on nickel substrate. The SLG Raman spectrum featured no D and D' band, indicating the pristine and high-quality nature of SLG. Among transition metals, nickel provides a better substrate for growing SLG. Since nickel is not Raman active, the direct Raman spectroscopy of graphene layers on top of the nickel is achievable. The graphene-metal composite can be utilized in thermal interface materials for thermal management applications.

Pyrolysis of Sodium Ethoxide.

Certain exemplary embodiments provide a process for producing gram-quantities of graphene, by the reduction of ethanol by sodium metal, followed by pyrolysis of the ethoxide product, and washing with water to remove sodium salts.

From Nanotubes.

Certain exemplary embodiments provide methods for the production of graphene ribbons can comprise cutting open nanotubes. In one such method multi-walled carbon nanotubes can be cut open in solution by action of potassium permanganate and sulfuric acid. In another method graphene nanoribbons can be produced by plasma etching of nanotubes partly embedded in a polymer film.

From Graphite by Sonication.

Certain exemplary embodiments disperse graphite in a proper liquid medium that is then sonicated. Non-exfoliated graphite is eventually separated from graphene by centrifugation. In certain exemplary embodiments, graphene concentration up to approximately 5.3 mg/ml in N-methylpyrrolidone (NMP) can be obtained. In certain exemplary embodiments, a suitable ionic liquid can be used as a dispersing liquid medium for graphite exfoliation.

Carbon Dioxide Reduction Method.

Certain exemplary embodiments provide a synthesis process involving a highly exothermic reaction in which magnesium is combusted in an oxidation-reduction reaction with carbon dioxide, producing a variety of carbon nanoparticles including graphene and fullerenes. The carbon dioxide reactant may be either solid (dry-ice) or gaseous. The products of this reaction are carbon and magnesium oxide.

Graphene oxide ("GO") can be in a form of a graphene oxide flake, dispersed graphene oxide flake, dispersed graphene oxide powder, graphene oxide powder, single layer graphene oxide (SLGO), multi-layered graphene oxide (MLGO), graphene oxide paper, chemical vapor deposition grown graphene on foils and wafers, graphene nano powder, graphene oxide, graphene in solution, reduced graphene oxide, reduced single layer graphene (SLG) coatings, graphite oxide, exfoliated graphite oxide, graphite oxide nano platelet, graphene oxide nano sheets, graphitic oxide, and/or graphitic acid, etc.

Graphene oxide; formerly called graphite oxide, graphitic oxide or graphitic acid; is a compound of carbon, oxygen, and hydrogen in variable ratios, obtained by treating graphite with strong oxidizers.

A maximally oxidized bulk product is yellow solid with C:O ratio between 2.1 and 2.9, which consists of loosely-bound layers, each being a substantially two-dimensional arrangement of carbon atoms in a "chicken-wire" (graphene) pattern, with epoxide groups (bridging oxygen atoms) and hydroxyl groups attached to both sides.

Graphene oxide can be used for a large-scale production and manipulation of graphene, a material with extraordinary electronic properties. Graphene oxide is an insulator, almost a semiconductor, with differential conductivity between approximately 1 and approximately $5 \times 10^{-3}$ Siemens/cm at a bias voltage of approximately 10 volts. Being hydrophilic, graphene oxide disperses readily in water, breaking up into macroscopic flakes, mostly one layer thick. Chemical reduction of graphene oxide flakes can yield a suspension of graphene flakes.

Partial reduction can be achieved by treating suspended graphene oxide with hydrazine hydrate at approximately 100° C. for approximately 24 hours, or by exposing graphene oxide to hydrogen plasma for a few seconds.

Reduction methods have been developed that do not use chemical solutions and can be performed at room temperature. A consumer camera flash can decompose graphene oxide to graphene. Dispersed graphene oxide flakes can also be sifted out of a dispersion (as in paper manufacture) and pressed to make a relatively strong graphene oxide paper.

Graphene products made by gas chemical vapor deposition on metal substrate might produce very small quantities useful for thin film application. Oxidizing processes can utilize relatively strong oxidizers. Such oxidizers chemicals can be a cause for environmental concerns. Such graphene products might also contain a lot of defects.

Certain exemplary embodiments provide a physically functionalized GHC, which can be used in a wide variety of applications; and represents a unique and specific graphene hybrid composite (GHC) which is further disclosed in the U.S. patent application Ser. No. 13/290,108, filed 7 Nov. 2011). GHC has been successfully registered as trademark.

In certain exemplary embodiments, the pyrolysis under an unoxidizing environment of a combination between specific solid carbon sources such as wood dust and additives yields a natural hybrid composite comprised of graphene and other graphitic carbons in which the major components are carbon nanotube and graphene. This product is called GHC showing superior electrical conductivity over than that of single carbon nano tube and single graphene. Manipulating the process and material set, a unique GHC product is achieved, which shows uniform small particles having bright colors and average particles size less than approximately 10 nanometers. These particles in situ can be dispersed or dissolved in solvents and/or can be ready for casting into thin or thick films. This GHC product is different from other products and can be converted into pure graphene and other nano carbons using suitable reduction agents. The unique GHC products are formed in a reactor chamber, but not by chemical reactions using hazardous and strong oxidizers. Thus, the referenced product is named "physically functionalized GHC" which can be relatively safely and relatively easily manufactured at a relatively large scale without significant environmental concerns. The physically functionalized GHC product can be used in a wide variety of applications regarding thin film, thick film, and powder format.

Certain exemplary embodiments can provide various kinds of physically functionalized GHC products.

Certain exemplary embodiments provide an electrically conductive element, which can comprise a physically functionalized graphene hybrid composite (GHC). The physically functionalized GHC can be a powder comprising particles having average diameter less than 10 nanometers. When analyzed via Raman spectroscopy, the physically functionalized GHC can show:

a major 2D band at approximately 2650 $cm^{-1}$; a minor D and G band at approximately 1350 $cm^{-1}$ and approximately 1575 $cm^{-1}$; and/or an intensity ratio of 2D band over D band and G band greater than 1.

The physically functionalized GHC can be a formed composite of more than one kind of graphitic carbons comprising at least one of a carbon nano-tube, graphite, graphene, graphene oxide, and/or amorphous carbon created via pyrolysis of a combination of solid carbon sources with specific additives under unoxidizing environment. A reactor forming the physically functionalized GHC can generate free radicals via at least one of a carbon generator, waste gas exhaustion mechanism, or reaction precursor agitation mechanism. The reactor manufacturing the physically functionalized GHC can be at least one of a vertical, horizontal, round bottom flask, and/or irregular shape.

The physically functionalized GHC can be used with a specific chemical reagent to enhance electrically conductivity as well as chemical and mechanical stability; wherein said specific chemical reagent is a reduction agent. The reduction agent can comprise at least one of a metal hydride, $NaBH_4$, hydrazine, NaOH, KOH, $Na_2SiO_3$, sodium, or potassium. The electrical conductive element comprises at least one of a binder, electrical conductive nano materials comprising nano metals, nano wire, nano rod of metals and semiconductors, nano graphitic carbons comprising fullerene, diamond, carbon nano tube, graphene, or graphite. The electrical conductive element can comprise a binder. The binder can be a polymeric binder, glass binder, ceramic binder, or metallic binder. The electrical conductive element can comprise a binder. The binder can be a polymeric binder that comprises at least one of an electrical conductive polymer, non-conducting polymer, thermoset polymer, crosslinking polymer, emulsion polymer, electrolyte or electrolytic polymer, water soluble polymer, or a poly amino acid.

The electrical conductive element can comprise a binder. The binder can comprise at least one of SiO2, $TiO_2$, ZnO, MnO, $Mn_2O_3$, $Mn_3O_4$, $Al_2O_3$, or KCl.

The electrical conductive element can be comprised by:
a substantially transparent conductor;
a conductive ink, lacquer, or adhesive;
a highly conductive thin film for large dimension applications such as replacing thin film prepared by vacuum technique for cost reduction;
a conducting powder for energy storage, nano cable, or super capacitor;
an energy conversion system or a solar cell;
an electro catalyst;
a biomedical system;
a mechanical strength enhancement composite;
an electro conductive ceramic composite; and/or
an alloy between said physically functionalized GHC with nano metals.

The physically functionalized GHC can be combined with a specific chemical agent in a high mechanical strength electrical conductive element. The physically functionalized GHC can be combined with a specific chemical agent and at least one of binder, reinforced materials comprising ceramic, aerogel, organo clays in a high mechanical strength electrical conductive element, FIG. 1 is a graph 1000 of a Raman spectra of graphene having substantially a single layer structure. FIG. 2 is a graph 2000 of a Raman spectra of graphene having more than substantially one layer; substantially bi-layer, and a few-layers. FIG. 3 is a graph 3000 of a Raman spectra of grade graphite (top), graphene oxide ("GO") (middle), and reduced graphene oxide (bottom).

Figure 4:
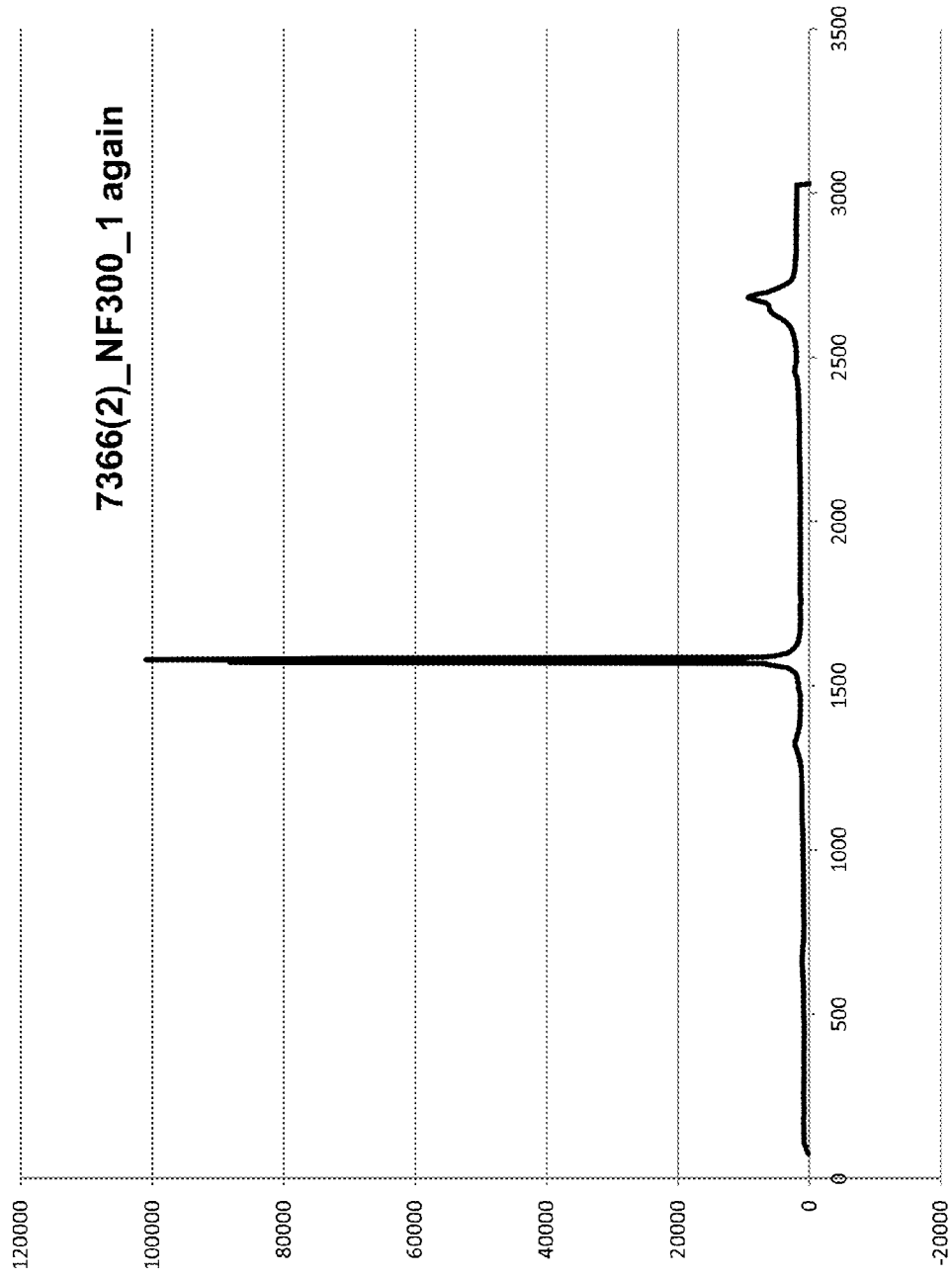
FIG. 4 is a graph 4000 of a Raman spectra for an exemplary physically functionalized GHC product type 1 according to an exemplary embodiment.

FIG. 4 is a graph 4000 of a Raman spectra for an exemplary physically functionalized GHC product type 1 according to an exemplary embodiment. One can recognize the very sharp G band at approximately 1582 $cm^{-1}$, representing a major graphite component.

Figure 5:
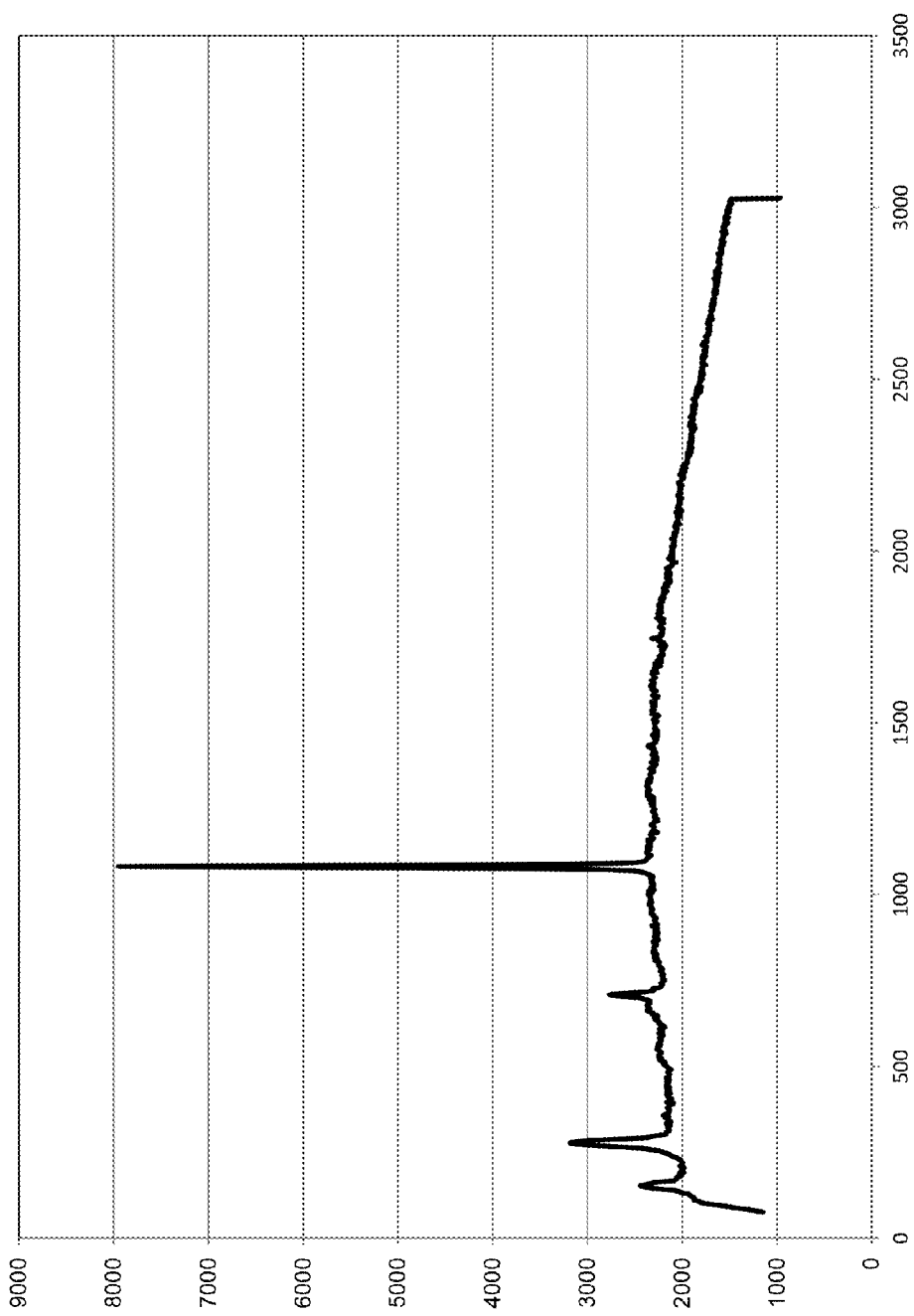
FIG. 5 is a graph 5000 of a Raman spectra for an exemplary physically functionalized GHC product type 2 according to an exemplary embodiment.

FIG. 5 is a graph 5000 of a Raman spectra for an exemplary physically functionalized GHC product type 2 according to an exemplary embodiment. One can recognize the very sharp band at approximately 1100 $cm^1$.

Figure 6:
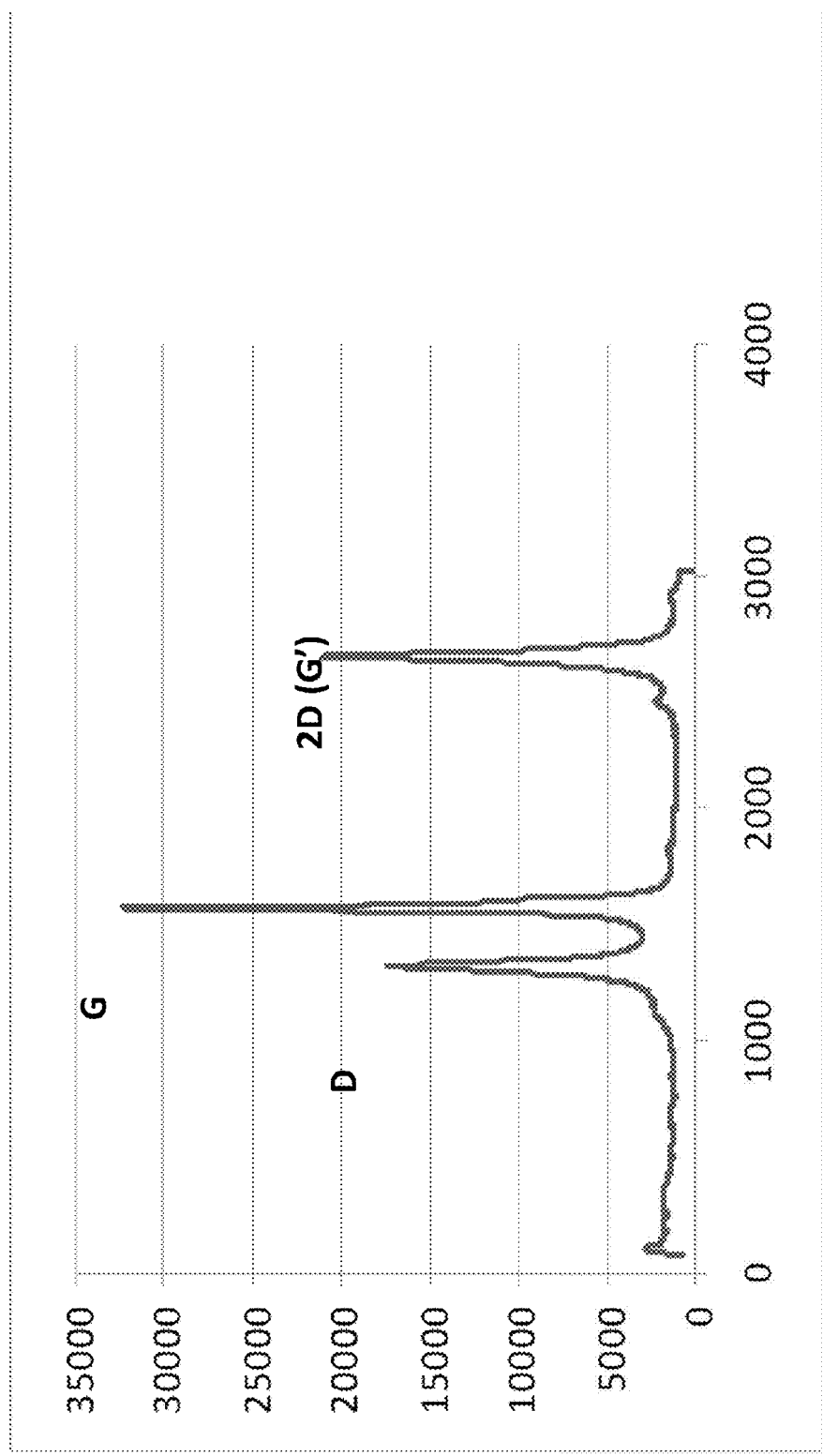
FIG. 6 is a graph 6000 of a Raman spectra for an exemplary physically functionalized GHC product type 3 according to an exemplary embodiment.

FIG. 6 is a graph 6000 of a Raman spectra for an exemplary physically functionalized GHC product type 3 according to an exemplary embodiment. One can see a D band at approximately 1332 $cm^{-1}$, a sharp G band at approximately 1582 $cm^{-1}$ and middle sharp 2D band in the vicinity of 2700 $cm^{-1}$. This GHC product could be a composite of at least; carbon nano tube, graphene and several kinds of graphene oxide as well as graphite.

Figure 7:
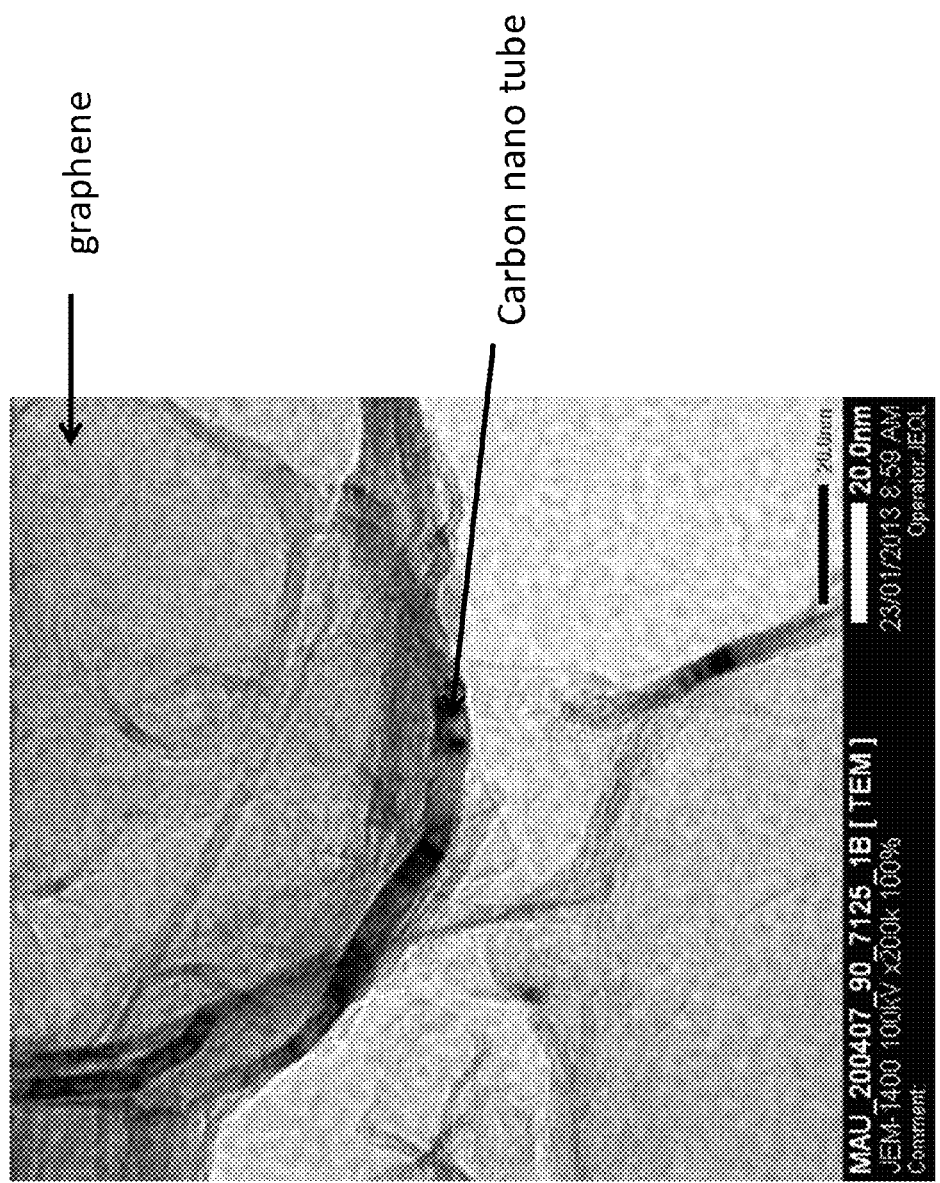
FIG. 7 is a transmission electron microscope ("TEM") image 7000 for an exemplary physically functionalized GHC product type 3 or GHC3 according to an exemplary embodiment.

FIG. 7 is a transmission electron microscope ("TEM") image 7000 for an exemplary physically functionalized GHC product type 3 ("GHC3") according to an exemplary embodiment. One can see this is a composite which comprises a relatively small portion of carbon nano tubes embedded in large portion of a graphene phase of which the appearance looks like a transparent sheet.

Certain exemplary embodiments can provide a supernatant obtained from certain kind of GHC product, which had been milled with IPA for approximately 24 hours without milling media yielding transparent color supernatant and sediment product. Supernatant isolated in a separate container and kept stilt for approximately 24 hours does not show any significant sediment products. The supernatant can then be evaporated out yielding a solid which can go back again into solution if it is contact with solvent. The above mentioned solid is identified as GHC product type 5 or simply GHC5.

Figure 8:
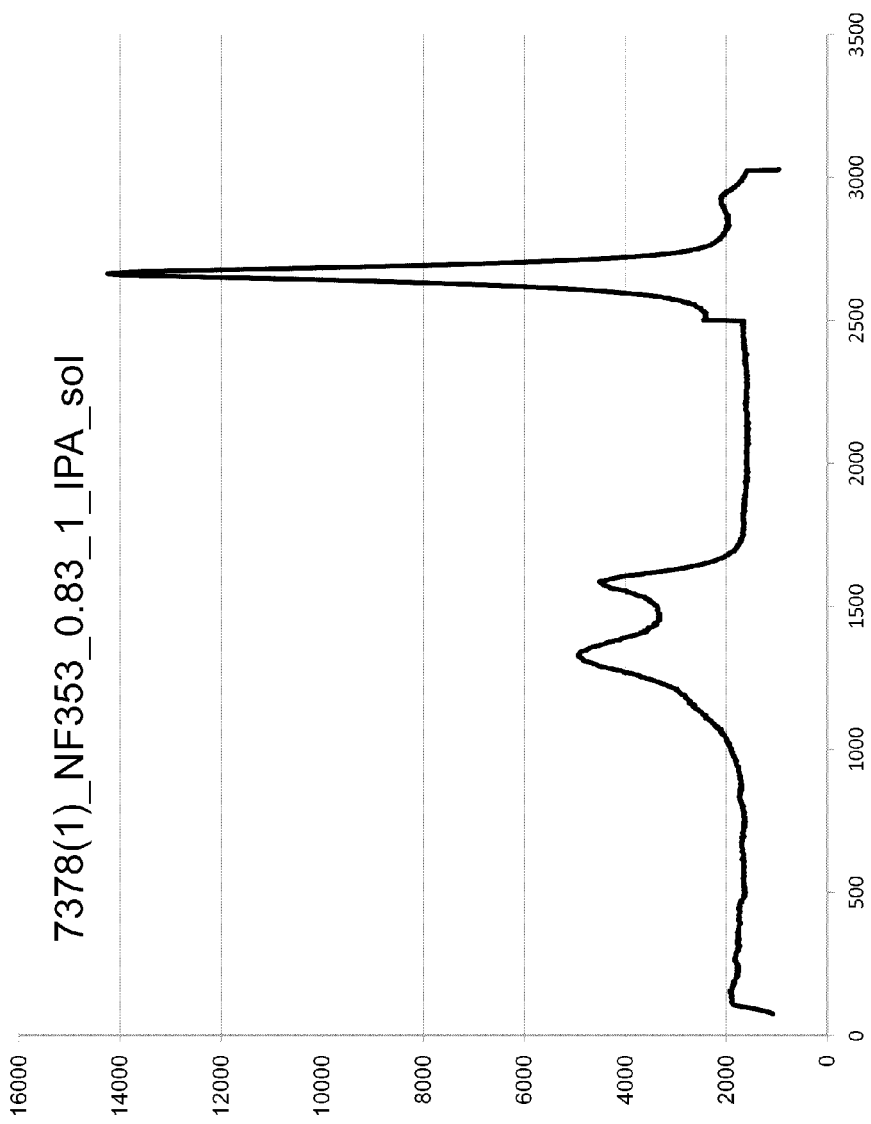
FIG. 8 is a graph 8000 of a Raman spectra for an exemplary physically functionalized GHC product type 5 or GHC5 according to an exemplary embodiment.

FIG. 8 is a graph 8000 of a Raman spectra for an exemplary physically functionalized GHC product type 5 ("GHC5") according to an exemplary embodiment. One can see a very sharp 2D or G' band with other two smaller D and G band, indicating that GH5 could contain a very large portion of graphene having substantially a single layer structure.

From the same embodiment above described for FIG. 8, the solid obtained from sedimentation experiment on GHC5 can be isolated and dried. This solid is identified as GHC product type 4 ("GHC4"). Even though that GHC4 and GHC5 came out from the same mother material, GHC4 is not soluble or not showing superior dispersion properties as GHC 5.

Figure 9:
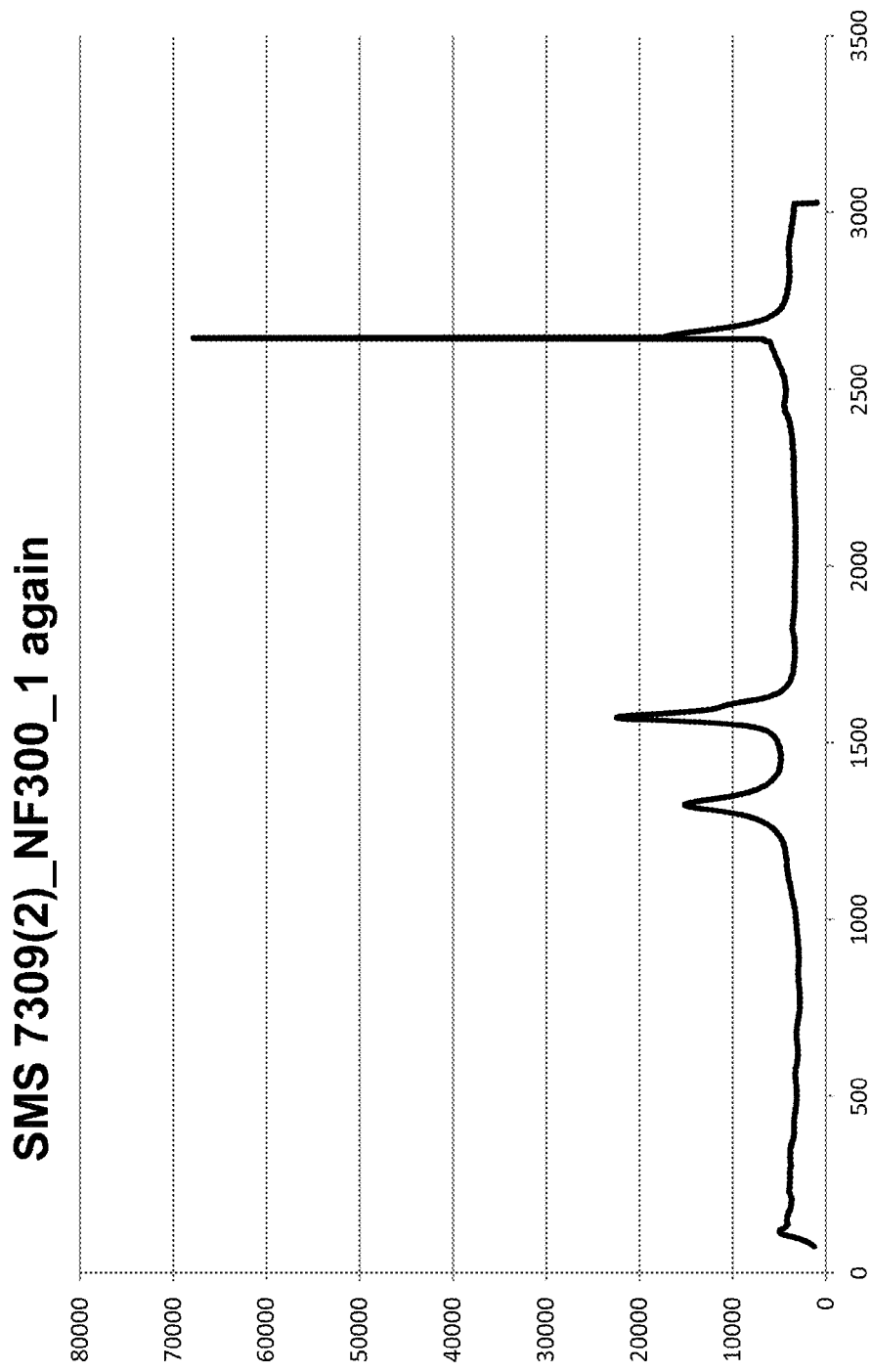
FIG. 9 is a graph 9000 of a Raman spectra according to an exemplary embodiment.

FIG. 9 is a graph 9000 of a Raman spectra according to an exemplary embodiment of physically functionalized GHC product type 4 ("GHC4"). One can recognize that GHC4 exhibits very strong 2D band, even stronger than that of GHC5, besides other two smaller D and G. This result indicates a large portion of graphene having single layer structure similar to product obtained by solid phase chemical vapor deposition process.

Figure 10:
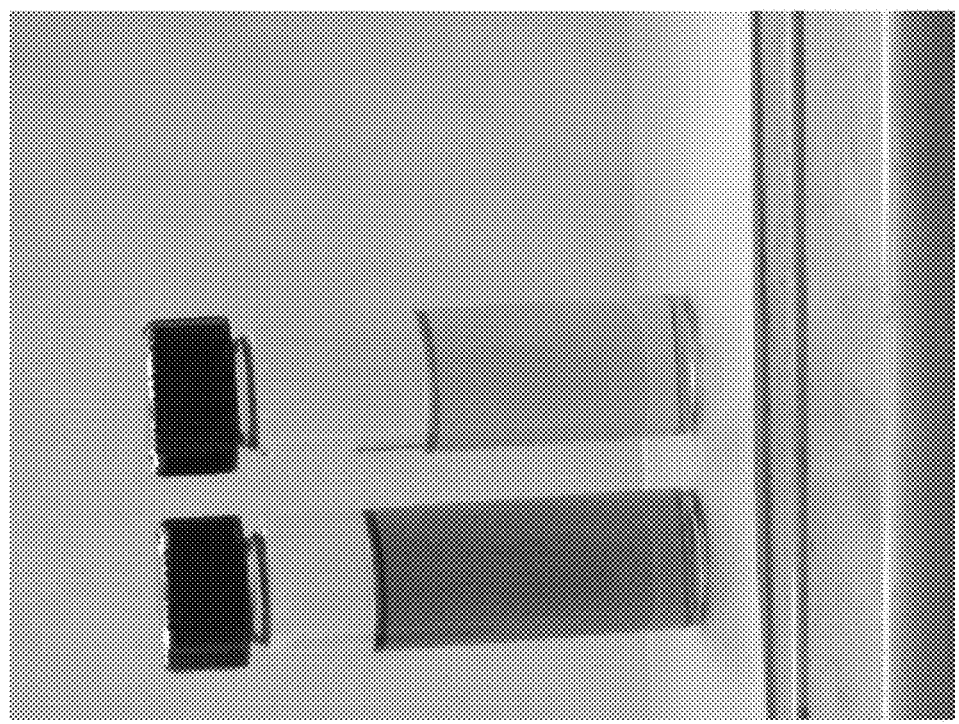
FIG. 10 is a color photograph 10000 of a solution of an exemplary physically functionalized GHC product type 5 or GHC5 dispersed in isopropanol alcohol ("IPA") and left stilt for approximately 24 hours; according to an exemplary embodiment.

FIG. 10 is a color photograph 10000 of a solution of an exemplary physically functionalized GHC product type 5 or GHC5 dispersed in isopropanol alcohol and left stilt for approximately 24 hours; according to an exemplary embodiment. There is no significant sediment product detected.

Figure 11:
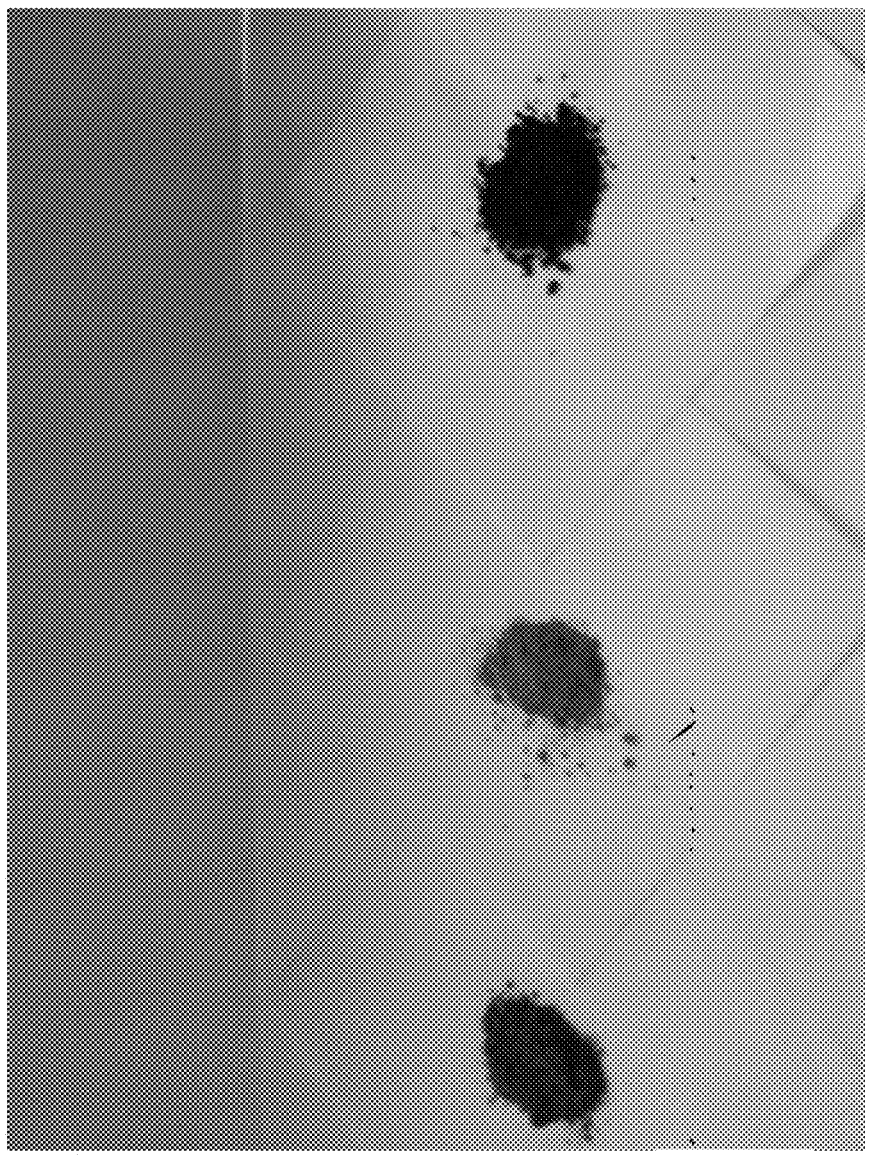
FIG. 11 is a color photograph 11000 of an exemplary physically functionalized GHC product type 4 or GHC4 powder; according to an exemplary embodiment.

FIG. 11 is a color photograph 11000 of an exemplary physically functionalized GHC product type 4 or GHC4 powder; according to an exemplary embodiment. Several different colors can be achieved that can be classified as GHC4 red, GHC4 light brown and GHC4 black. In certain exemplary embodiments, GHC4 can show up in a light yellow color. Some graphitic carbon products such as graphite, carbon black, graphene nano platelet show dark color in their solid state.

Figure 12:
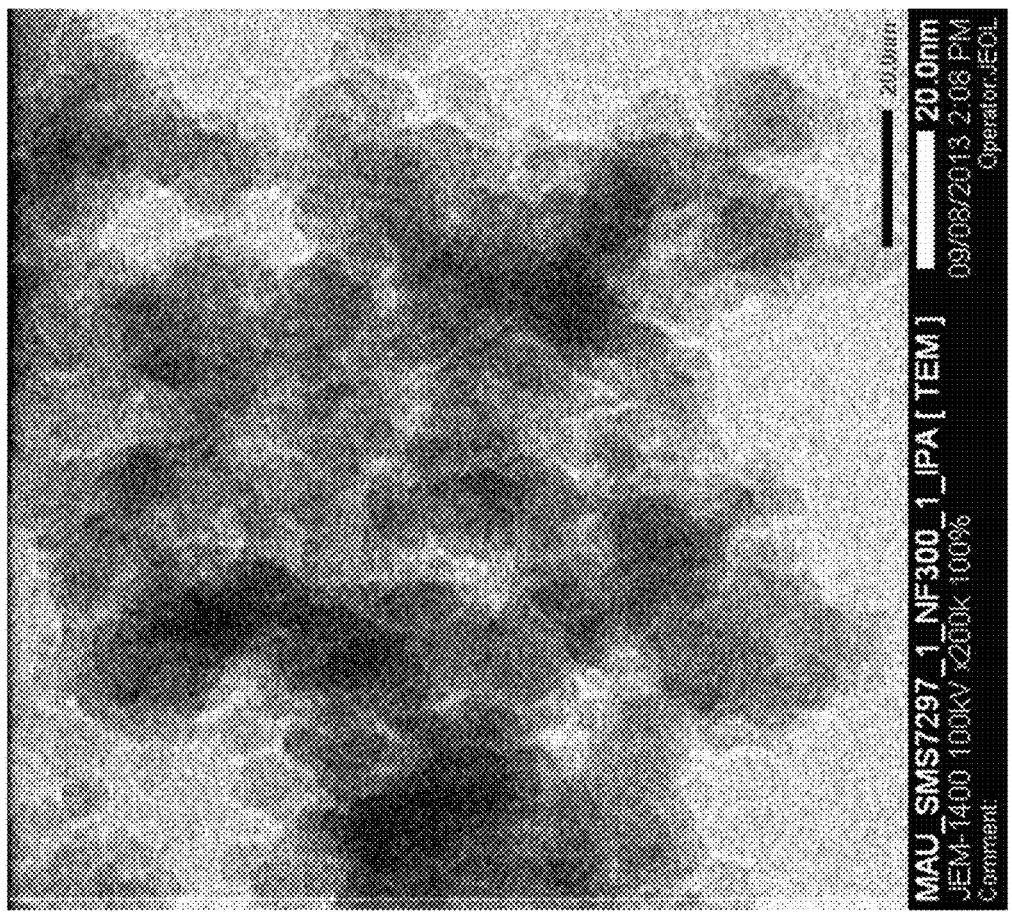
FIG. 12 is a transmission electron microscope (ILM) image 12000 for an exemplary physically functionalized GHC product type 4 or GHC4 according to an exemplary embodiment.

FIG. 12 is a transmission electron microscope (TEM) image 12000 for an exemplary physically functionalized GHC product type 4 or GHC4 powder according to an exemplary embodiment. Many substantially uniform particles having average size less than approximately 10 nanometers can be isolated (not accumulated) to prove the good dispersion quality of the powder.

The content and categories of the impurities in the physically functionalized GHC can significantly contribute to the physical properties, which can vary depend upon the chemistry of the carbon sources, the interaction between the key carbon sources and other additives, the burning or baking process parameters such as temperature, heating rate, bake time, stock feeding amount, and/or physical shape of the reactor in which the heat distribution may vary, etc.

Figure 13:
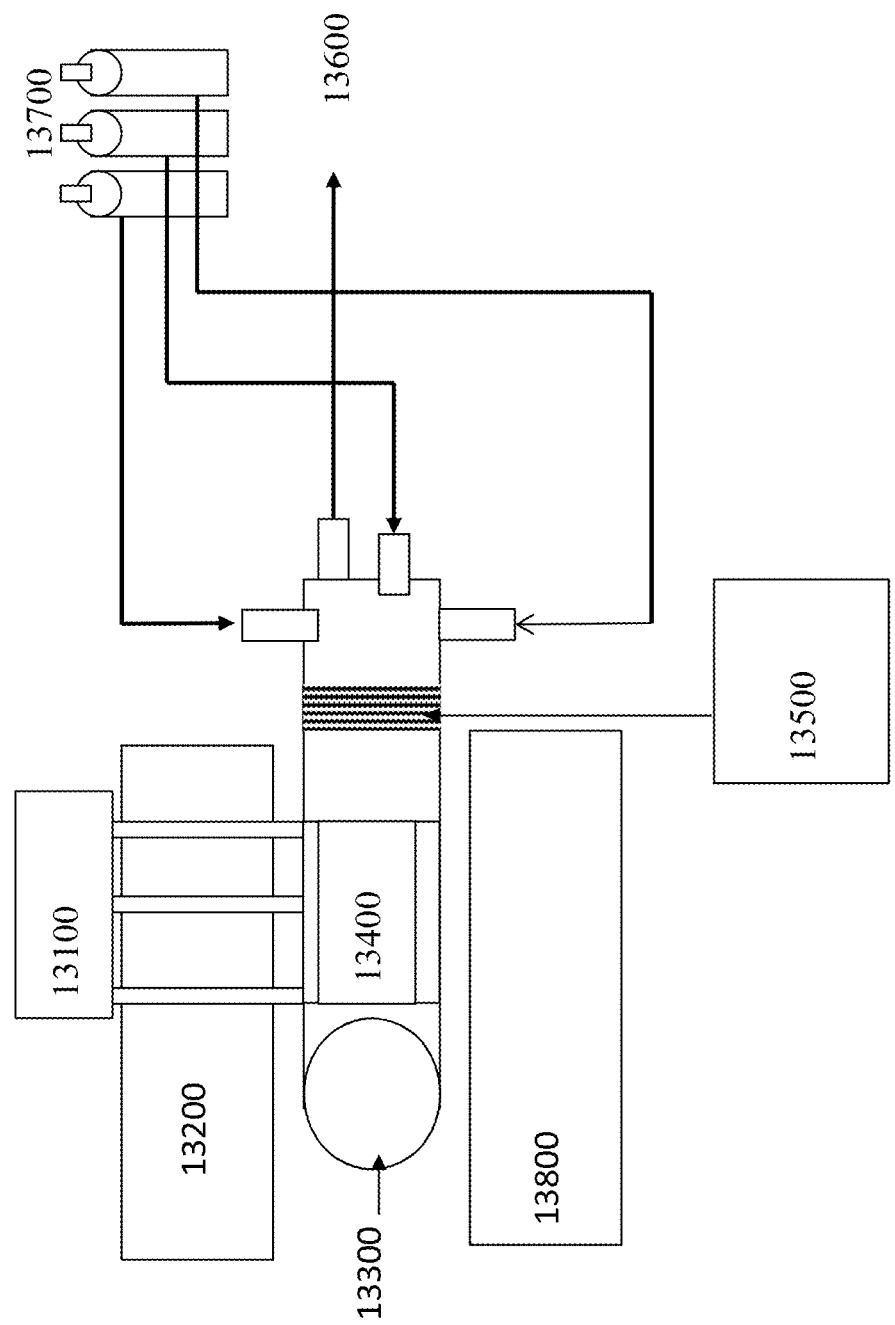
FIG. 13 is a schematic diagram 13000 of a reactor.

FIG. 13 is a schematic diagram 13000 of a reactor, which can comprise one or more of the following:

A heat resistant and unoxidized reaction chamber 13400 having mechanism of mixing and agitating raw materials. Reaction chamber 13400 can be selectively designed so it can provide different mixing and agitating mechanisms during reaction. Reaction chamber 13400 can be a horizontal, vertical, or a substantially round bottom flask, etc.

Free radical generators 13200 and 13800, which can perform the function of generating free radicals from variable carbon sources. The free radical generation elements can be a heating element, infra-red, irradiation, plasma, and/or magnetic heater, etc. Free radical generators 13200 and 13800 can be heat sources and/or plasma sources.

A temperature controller 13100 adapted to control reaction chamber temperature.

A gas introducing mechanism and gas flow meter system 13700 to control the atmosphere of the reactor chamber.

A connector and reactor rotation controller 13500.

A waste gas exhaust 13600.

The precursor can comprise mainly solid carbon sources and other additives such as separators, the carbon sources can be gas carbon source molecules and/or liquid carbon source molecules in a substantially free molecule format or can be adsorbed on a solid substrate. The carbon sources can be relatively low molecular weight molecules carrying carbon atoms having average molecular weight ranging between approximately 10 and approximately 1000. The carbon sources can be polymers having carbon atoms on main chain or side chain with average molecular weight ranging between approximately 10 and several hundred million. Examples of substantial solid carbon sources are cellulosic materials such as rice, flour, starch, cotton, wood, fat, animal and vegetable oils, wax, saturated and unsaturated aliphatic, organic substances including meat, seafood, fish, fruit, vegetable, cereals, coffee bean, soybean, and/or any kind of bean, etc.

A separator is substance which can help to separate and isolate carbon sources into as small a unit as practicable. A separator molecule can be a surfactant including an ionic and/or a nonionic surfactant. Separator molecules can also be catalysts selected from inorganic minerals, rare earth elements, and/or organic and inorganic salts, etc.

A baking process occurs in an unoxidizing environment which can comprise an inert gas such as, but not limited to, nitrogen and/or argon. Baking temperature can be between approximately 100 degrees Celsius to approximately 1200 degrees Celsius by either fast bake or slow bake depend upon reactor configuration. Bake times can range between approximately 1 second to approximately 10 hours, preferably, between approximately 5 minutes and approximately 5 hours.

In certain exemplary embodiments, physically functionalized GHC can be characterized by one or more of:

A fabrication process that is more physical than chemical, not using strong oxidizer or hazardous chemicals.

Small particles having substantially a single layer structure.

Adapted to be well dispersed in solvents.

In certain exemplary embodiments, the physically functionalized GHC can be used for multiple applications which can include, but are not limited to:

Transparent conductor.

Conductive ink, lacquer, and/or adhesive.

Highly conductive thin film for large dimension applications and/or replacing thin film prepared by vacuum techniques for cost reduction.

Conducting powders for energy storage, nano cable.

Energy conversion in renewable energy, solar cell.

Electro catalyst.

Biomedical uses.

Mechanical strength enhancement composites.

Electro conductive ceramic composites.

Alloy between the physically functionalized GHC with nano metals.

Transparent conducting films (TCFs) are optically transparent and electrically conductive in thin layers. TCFs for photovoltaic applications have been fabricated from both inorganic and organic materials. Inorganic films can comprise a layer of transparent conducting oxide (TCO); generally in the form of indium tin oxide (ITO), fluorine doped tin oxide (FTO), and/or doped zinc oxide. Organic films can be developed using carbon nanotube networks and graphene, which can be fabricated to be highly transparent to infrared light, along with networks of polymers such as poly(3,4-ethylenedioxythiophene) and its derivatives. Transparent conducting films can act as a window for light to pass through to an active material beneath (where carrier generation occurs), as an ohmic contact for carrier transport out of the photovoltaic, and can also act as transparent carrier for surface mount devices used between laminated glass or light transmissive composites. Transparent materials can have band gaps with energies corresponding to wavelengths which are shorter than the visible range of approximately 380 nanometers to approximately 750 nanometers. As such, photons with energies below the band gap might not be collected by these materials and thus visible light can pass through. However, applications such as photovoltaic may have an even broader band gap to avoid unwanted absorption of the solar spectra.

Certain exemplary embodiments can provide the process of making substantially transparent film on a substantially transparent substrate by casting a solution mixture of physically functionalized GHC5, polymeric binder, and/or a specific chemical reagent. Physically functionalized GHC5 can be the source of graphene, the polymer can act as a film forming aid, and/or the specific chemical reagent can react with GHC producing final electrical conductive properties in the film while the substantial transparency of the film is maintained. Solvents, physically functionalized GHC, polymeric binders, and specific chemical reagents are four possible components in a transparent coating formulation.

Solvents, which can disperse physically functionalized GHC5 particles, are polar solvents and non-polar solvents. The examples of polar solvents are water, tetrahydrofurane, dioxane, chlorinated, fluorinated solvents such as dichloromethane, 1,1,2-trichloroethane, hydroxylated solvents such as monoalcohol including but not limited to methanol, ethanol, isopropanol, hexanol, butanol, cyclohexanol, polyol including 1,5-pentane diol, and/or ethylene glycol, etc. Nonpolar solvents can comprise n-hexane, toluene, benzene, xylene, and/or cyclohexane, etc.

Polymers enhancing film forming properties can be selected from electrical conductive polymers, non-conducting polymers, thermoset polymers, crosslinking polymers, emulsion polymers, electrolyte or electrolytic polymers, water soluble polymers, and/or polyamino acids, etc.

Examples of electrical conductive polymers include, but are not limited to, phenylene vinylidene polymer, light emitting polymer, acrylonitrile butadiene styrene ("ABS") resin, tree rubber, which are normally conjugated polymers having conjugated bonds in the backbone or in the side chain, poly(3-hexyl thiophene) and poly(2-methoxy-5-(3,7-dimethyloctyloxy)-p-phenylene-vinylene), etc.

Examples of non-conducting polymers include, but are not limited to, vinyl polymers, poly carbonate, polysulphone, poly arylene, a fluorinated polymer (Teflon and the like), a hydroxylated polymer such as polyvinyl butyral, polyesters, hemicellulose from Natta de coco, chitin, and chitosan, etc. Examples of thermoset polymers include, but are not limited to, polyamic polymers and polyimide polymers, etc. Examples of water soluble polymers include, but are not limited to, polyethylene glycol, polyvinyl alcohol, poly imidazole, and poly Benz imidazole, etc. Examples of crosslinking polymers include, but are not limited to, polydimethylsiloxane, epoxy resin, and hydroxylated polyesters, etc. Examples of electrolyte polymers include, but are not limited to, Nafion (trade mark from Dupont), poly styrene sulfonic acid, and liquid nano coals, etc. Examples of polyamino acids include, but are not limited to, poly-L-alanine, poly-L-aspartic acid, gelatin, arginine, asparagine, cysteine, glutamine, glycine, histidine, lysine, and proline, etc. The polymeric binder can have a polymer content from approximately 0% up to approximately 99.999% by weight.

In the transparent conductor application, the inorganic binders can be used besides organic polymers. Certain exemplary embodiments can provide transparent film cast from the aqueous mixture of physically functionalized GHC embedded in a glass binder comprising of silica derivatives such as Na2SiO3, silanol —SiOH, and/or one or more silane coupling agents, etc.

Specific chemical reagents work as electrical converter, reduction agent which converts physically functionalized GHC5 into higher electrical conductivity GHC6. GHC6 also shows enhanced thermal stability, chemical stability, and mechanical strength over the parent material GHC5. Without these reagents, the transparent film will stay less electrical conducting, less chemical stability and less mechanical stability. Thus, under some circumstances, the physically functionalized GHC can work as an intermediate which helps to form thin film from wet coating then converted into electrical conductive element, chemical stabilizer, and/or mechanical enhancer, etc. Most of highly pure carbon products such as carbon nano tube, graphene, fullerene, diamond, graphite, carbon black show poor compatibility with solvents, can be hard to use, and/or might need to be functionalized to carry polar functional groups to enhance solvent compatibility. The specific chemical reagents can comprise one or more of NaBH4, NaOH, KOH, hydrazine, metal hydrides, and/or hole transport molecules, etc.

Besides polymeric binder, GHC, chemical reagent, electrical conductive aid additives can be added on to the casting solution to enhance electrical conductivity. These additives can comprise one or more of:

a) Nano particles of metals such as nano gold, nano silver, nano copper, nano Al, nano Ni, and/or nano Cr, etc. The average particle size of the nano metals can be in the range of approximately 5 nanometers. The concentration of nano metals in the transparent coating solution can range from approximately 0.001% to approximately 50% by weight, preferably, between approximately 0.01% and approximately 20% by weight.

b) Nano metal oxides such as WOx.

c) Nano wire including metal nano wires such as Ni, Pt, and/or Au, etc.; semiconductor nano wires such as Si, InP, GaN, and/or molecular nanowires, etc. Molecular nanowires can comprise repeating molecular units either organic (e.g. DNA) or inorganic (e.g. Mo6S9-xIx).

d) Nano rod such as ZnO nanorod, gold nanorods, $TiO_2$ nanorod, and/or GaAs nanorod, etc.

e) Precursors for electrical conductivity such as $InCl_3$, $SnCl_4$, and/or $WCl_3$, etc.

f) Electron transport molecules such as polycyclic aromatic hydrocarbons (PAHs), perylene derivatives, poly(3-hexyl thiophene), and/or poly(2-methoxy-5-(3,7-dimethyloctyloxy)-p-phenylene-vinylene), etc.
g) Charge transfer complexes such as TTF-TCNQ and/or PVK-TNF, etc.
h) Chelates such as metal phthalocyanine pigments, and/or porphyrine, etc.
i) Hole transport molecules comprising one or more of hydrazine, and/or triphenyl amine derivatives, etc.
j) Nano carbon materials such as graphite, carbon nano tube, fullerene, diamond, etc.

Casting of the film can be done by any of a number of different process including spin coating, dip coating, blade coating, spray coating, filter media coating, wound wire bar coating, and/or hopper coating, etc. A wet film can be dried via a baking process such as convection oven and/or vacuum oven, etc.

Other additives that can be added on the formulation of an electrical conductive element containing physically functionalized GHC to improve magnetic properties can comprise one or more of a mineral, ferrofluid, magnetic nano particle, ferric oxide, Co, and/or Ni, etc.

Conductive ink can be used for manufacturing of microelectronics by digital printing process. Printed electronics is a set of printing methods used to create electrical devices on various substrates. Printing typically uses printing equipment or other equipment suitable for defining patterns on material, such as screen printing, flexography, gravure, offset lithography, laser, dip pen lithography and/or inkjet, etc.

Certain exemplary embodiments provide a conductive ink comprising physically functionalized GHC5 and a reduction agent. The physically functionalized GHC5 can be readily dispersed in solvents and the conductive ink can be formulated by adjusting viscosity as well as additives depend upon the type of printing technology. No matter what printing technology is used for printing, the printed ink can be exposed to thermal treatment (annealing, baking) in order to achieve good electrical conductivity.

Certain exemplary embodiments provide a conductive paint, lacquer, and/or paste using physically functionalized GHC5. GHC5 can be reduced by hydrazine into GHC6 powder, which already shows high electrical conductivity. GHC6 can then be dispersed in ABS resin and/or dissolved in THF to form a paste. After being painted by a brush and allowed to dry, the painted master shows electrical resistivity of approximately 150 ohm/square meter. The conductive paint, lacquer can comprise one or more oxides (insulator and semiconductor) such as $SiO_2$, $Al_2O_3$, MnO, $Mn_2O_3$, $Mn_3O_4$, $TiO_2$, ZnO, $CaCO_3$, $In_2O_3$, KCl, K, Na, nano metals, semiconductor nano wires, nanorods, and/or other graphitic carbons (e.g., graphite, carbon nanotube, fullerene, carbon nano fiber, and/or carbon nanorod, etc.), etc.

One advantage of physically functionalized GHC5 is the capability of making large dimension thin films without using vacuum technique. Similar to transparent conductor application, a wet solution can be coated on a large dimension using conventional web coating techniques such as hopper coater, blade coater, and/or dip coater, etc.; which can be followed with a drying process. After being thermally treated, the electrical conductive web using GHC5 can be used for the manufacturing of various kinds of microelectronic devices including, but not limited to, complementary metal-oxide-semiconductor ("CMOS"), printed electronics, and/or supra capacitors, etc.

Certain exemplary embodiments provide GHC5 and GHC6 powder for energy storage comprising one or more of a supracapacitor and/or modified lithium iron phosphate battery, etc. Certain exemplary embodiments provide GHC6 powder in a hollow plastic wire to form a cable adapted to replace copper wire. These cables can transmit electrical signals very well without generating heat and minimize data lost, compared to the conventional cable using copper wire.

Certain exemplary embodiments provide a relatively high mechanical strength composite having relatively high electrical conductivity adapted to replace conventional metals in electro-conductive mechanical processing by using physically functionalized GHC and suitable additives. Such composites can have relatively high mechanical strength, chemical stability, and/or high electrical and thermal conductivity, which can be used in a wide variety of applications including, but not limited to, electromagnetic shielding devices, and/or bipolar plates for a hydrogen fuel cell, etc. The additives vary with different applications. The additives can comprise organic clays for making conductive ceramics, and/or crosslinking and thermoset polymers for high performance composites.

Certain exemplary embodiments provide and alloy between graphene and certain kinds of metal by mixing the yellow solution of GHC5 comprising a reduction agent (e.g., hydrazine in IPA) and aqueous solution of $H_2PtCl_6$. The solvent can be evaporated out using a convection oven set at approximately 80 degrees Celsius for approximately two hours and then raising the temperature to approximately 150 degrees Celsius yielding a substantially black solid. Hydrazine can reduce GHC 5 into highly electrical conductive GHC6 at the same time H2PtCl6 is converted into nano Pt. The alloy can be produced when the dried mix was annealed at approximately 800 degrees Celsius in gaseous nitrogen for approximately two hours.

The above described alloy demonstrated electro catalyst performance in a hydrogen fuel cell where hydrogen gas is effectively converted into electricity. The conversion efficiency of Pt/graphene alloy is much better than that of a Vulcan/Pt system. Certain exemplary embodiments can by utilized in one or more of:
  energy conversion in renewable energy;
  electro catalyst;
  biomedical uses;
  mechanical strength enhancement composites; and/or
  electro conductive ceramic composites; etc.

Certain exemplary embodiments can provide a graphene hybrid composite (GHC) embedded in a binder matrix comprising specific additives. The GHC can be formed between specific nano carbon materials and graphene generated via pyrolysis of solid carbon sources. An X-ray diffraction analysis of the GHC can show peaks at two theta values of approximately 26.5 degrees, approximately 42.5 degrees, and approximately 54.5 degrees. A Raman spectroscopy analysis of the GHC can show a peak at least at approximately 2650 (1/centimeter) (2D band).

Carbon can have four unique crystalline structures comprising diamond, graphite, fullerene, and carbon nano-tubes. Graphene is an allotrope of carbon, whose structure is substantially one-atom-thick planar sheets of sp-bonded carbon atoms that are packed in a honeycomb crystal lattice. Graphene can be visualized as an atomic-scale sheet made of carbon atoms and their bonds. The crystalline or "flake" form of graphite consists of many graphene sheets stacked together.

The phrase "carbon nano-tube" ("CNT") refers to a tubular structure, which can be grown with a single wall or multi-walls. A CNT can be conceptually visualized as rolling up a graphene sheet or several graphene sheets to form a concentric hollow structure. CNTs have a diameter on the order of a few nanometers to a few hundred nanometers. CNTs can function as either a conductor or a semiconductor, depending on the rolled shape and the diameter of the tubes. A longitudinal, hollow structure imparts unique mechanical, electrical, and chemical properties to CNTs. CNTs can be used in field emission devices, hydrogen fuel storage, rechargeable battery electrodes, and/or composite reinforcements, etc. However, CNTs can be relatively expensive due to the low yield and low production and purification rates associated with certain CNT preparation processes. High material costs might hinder widespread application of CNTs.

A graphene sheet comprises carbon atoms occupying a two-dimensional hexagonal lattice. By dispersing oxidized and chemically processed graphite in water, and using paper-making techniques, substantially monolayer flakes can form a single sheet and bond relatively powerfully. Such sheets, which can be called graphene oxide paper, can have a measured tensile modulus of approximately 32 Gigapascals ("GPa"). Chemical properties of graphene oxide can be related to functional groups attached to graphene sheets. The functional groups can change the pathway of polymerization and similar chemical processes. Graphene oxide flakes in polymers can have enhanced photo-conducting properties compared to polymers lacking such flakes. However, the graphene oxide is prepared by the oxidation of graphite with hazardous chemicals such as H2SO4, HNO3, H3PO4, thus large quantity production can be challenging.

Graphene nano platelets can comprise a stack of multi-layer graphene sheets. Graphite has a layered, substantially planar structure. In each layer, the carbon atoms are arranged in a hexagonal lattice with separation of approximately 0.142 nanometers ("nm"), and the distance between planes is approximately 0.335 nm. Two forms of graphite, alpha (hexagonal) and beta (rhombohedral), have very similar physical properties (except that the graphene layers stack slightly differently). The hexagonal graphite can be either flat or buckled. The alpha form can be converted to the beta form through mechanical treatment and the beta form can revert to the alpha form when it is heated above approximately 1300° Celsius. The layering contributes to its relatively low density.

According to U.S. patent application disclosed in Ser. No. 13/290,108, a graphene hybrid composite (GHC) can be comprised of tubular carbon and graphene produced via pyrolysis of a solid carbon source under an unoxidizing environment. When analyzed via X-ray diffraction, the hybrid composite can generate peaks at two theta values of approximately 26.5 degrees, approximately 42.5 degrees, and/or approximately 54.5 degrees. When analyzed via Raman spectroscopy, a Raman spectroscopy of the hybrid composite can show peak at least at approximately 2650 (1/centimeter) (2D band).

FIG. 14 is a table 14000 of properties of various exemplary embodiments of graphene hybrid composites prepared from a first proprietary solid carbon source obtained from certain kind of tree wood ("SGP"), which is different from GTM.

Figure 15:
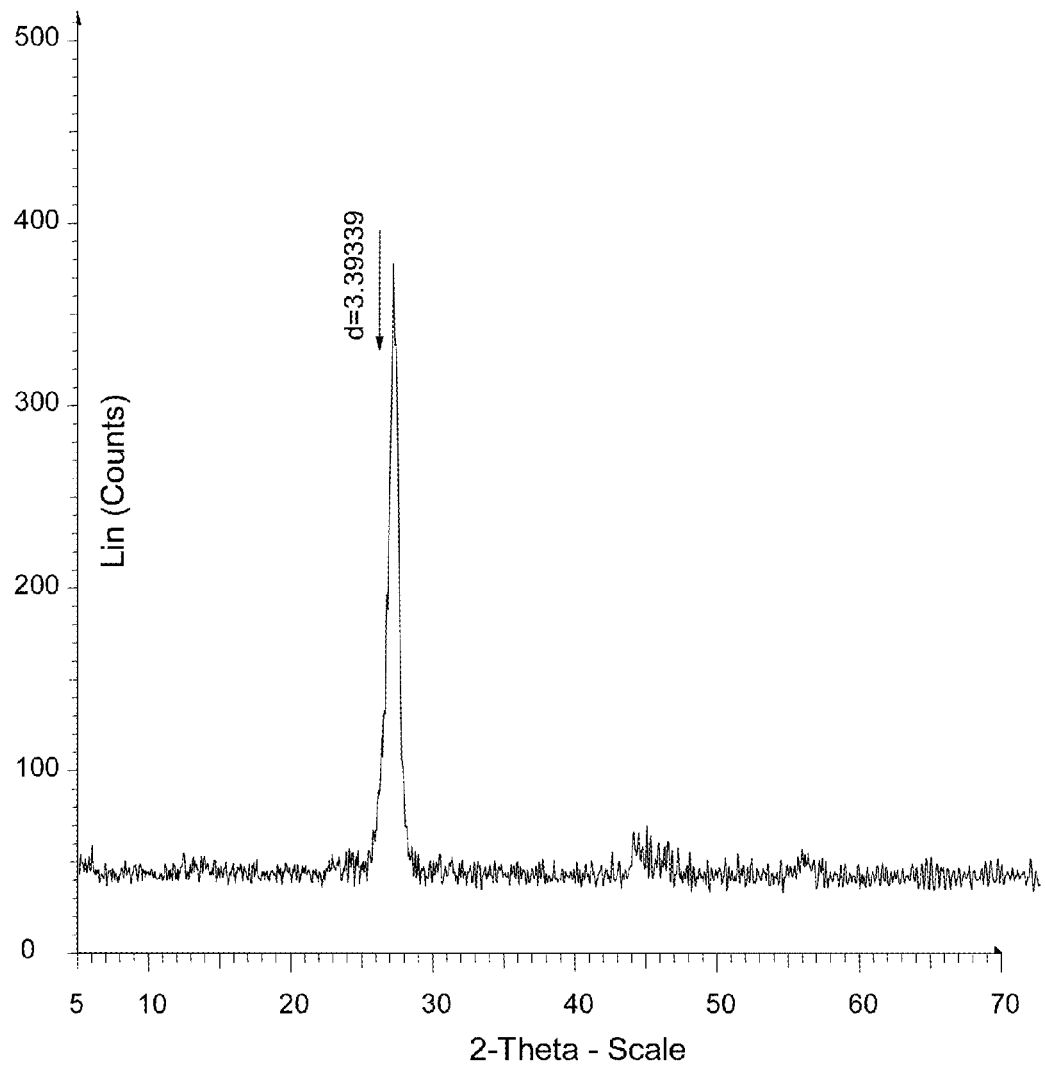
FIG. 15 is a graph 15000 of X-ray Diffraction ("XRD") spectroscopy results for an exemplary GHC product according to an exemplary embodiment.
Figure 16:
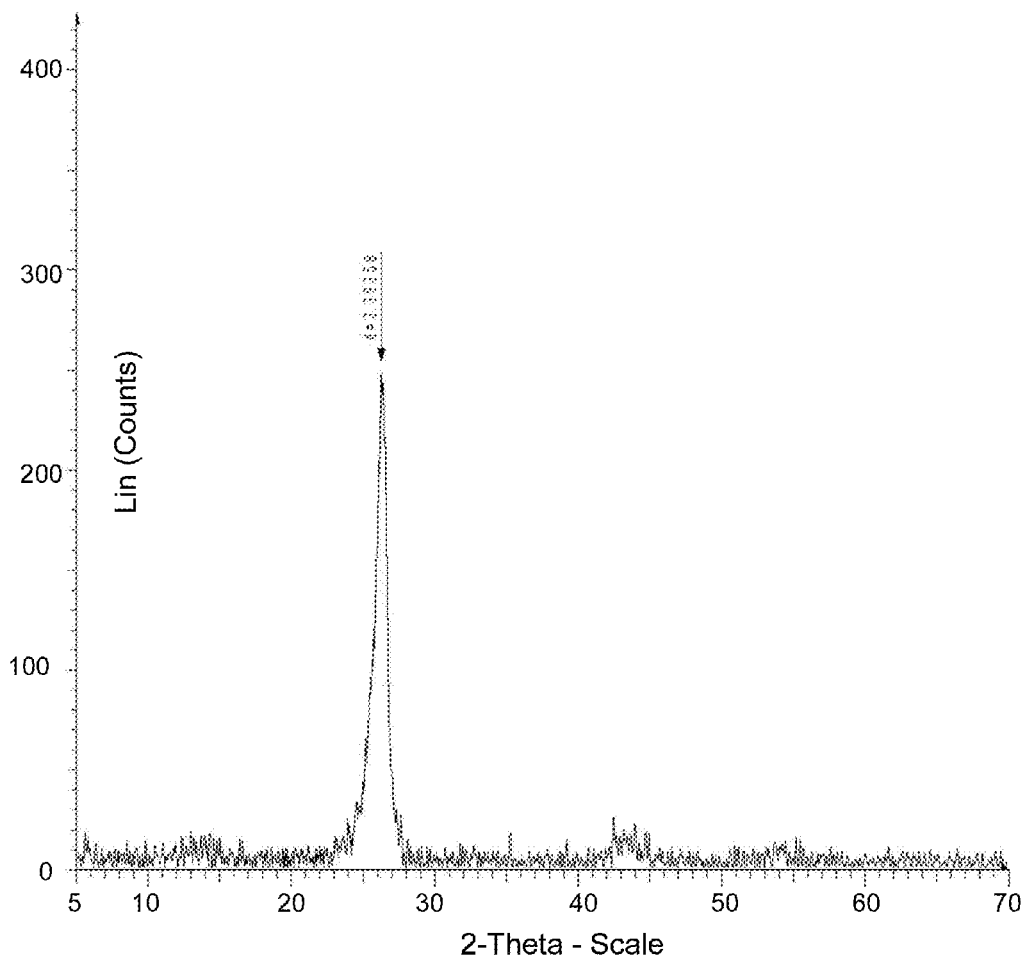
FIG. 16 is a graph 16000 of XRD spectroscopy results for an exemplary GHC product according to an exemplary embodiment.

FIG. 15 and FIG. 16 indicate XRD for GHC products prepared from different solid carbon sources according to an exemplary embodiment; carbon source 1 (SGP) and carbon source 2, which carbon source 2 is a second proprietary solid carbon source obtained from tree wood ("GTM").

Figure 17:
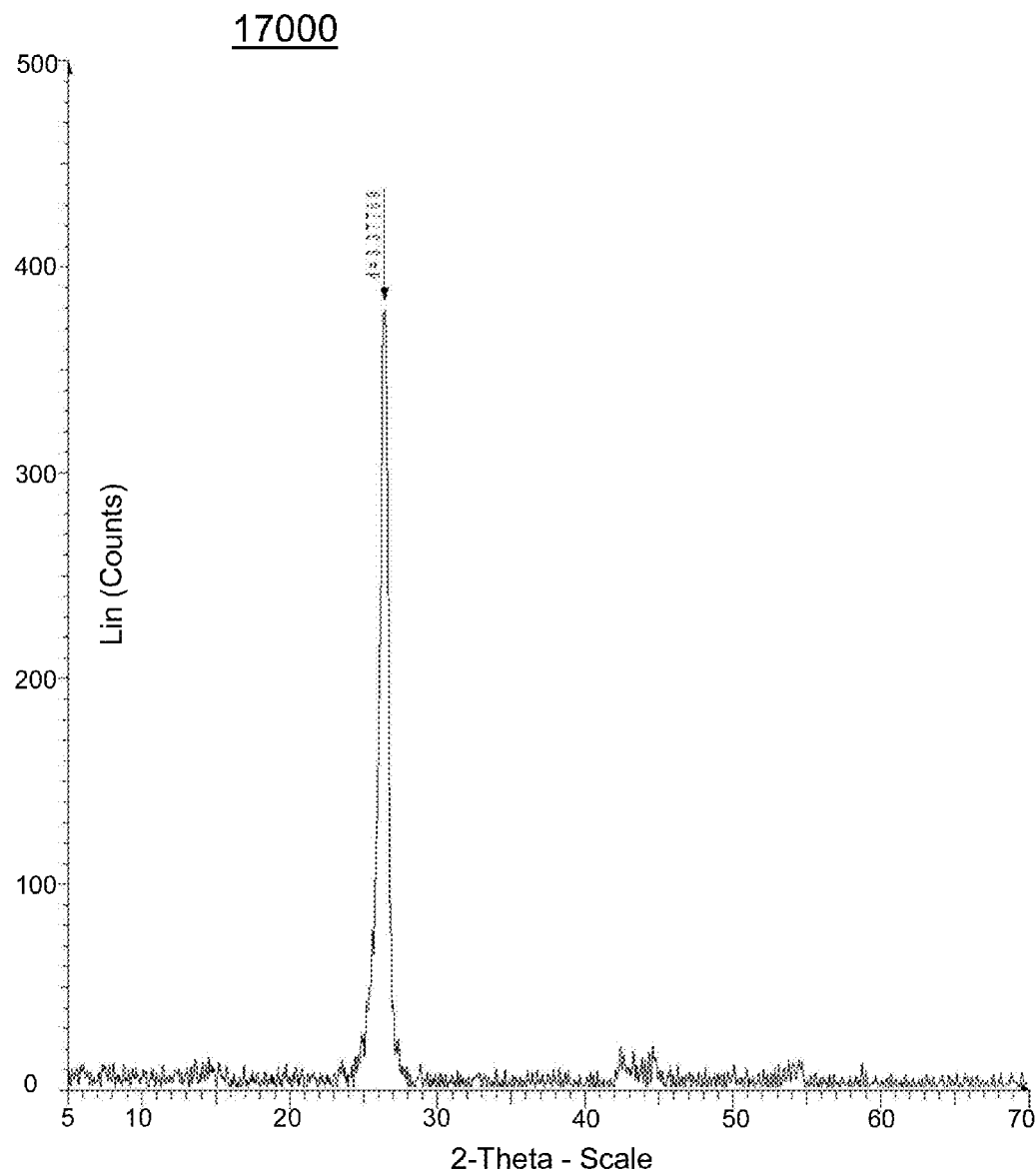
FIG. 17 is a graph 17000 of XRD spectroscopy results for an exemplary GHC product according to an exemplary embodiment that comprises no metal or minerals.

FIG. 17 is a graph 17000 of XRD for an exemplary GHC product according to an exemplary embodiment; containing no metal and minerals (after purification).

Figure 18:
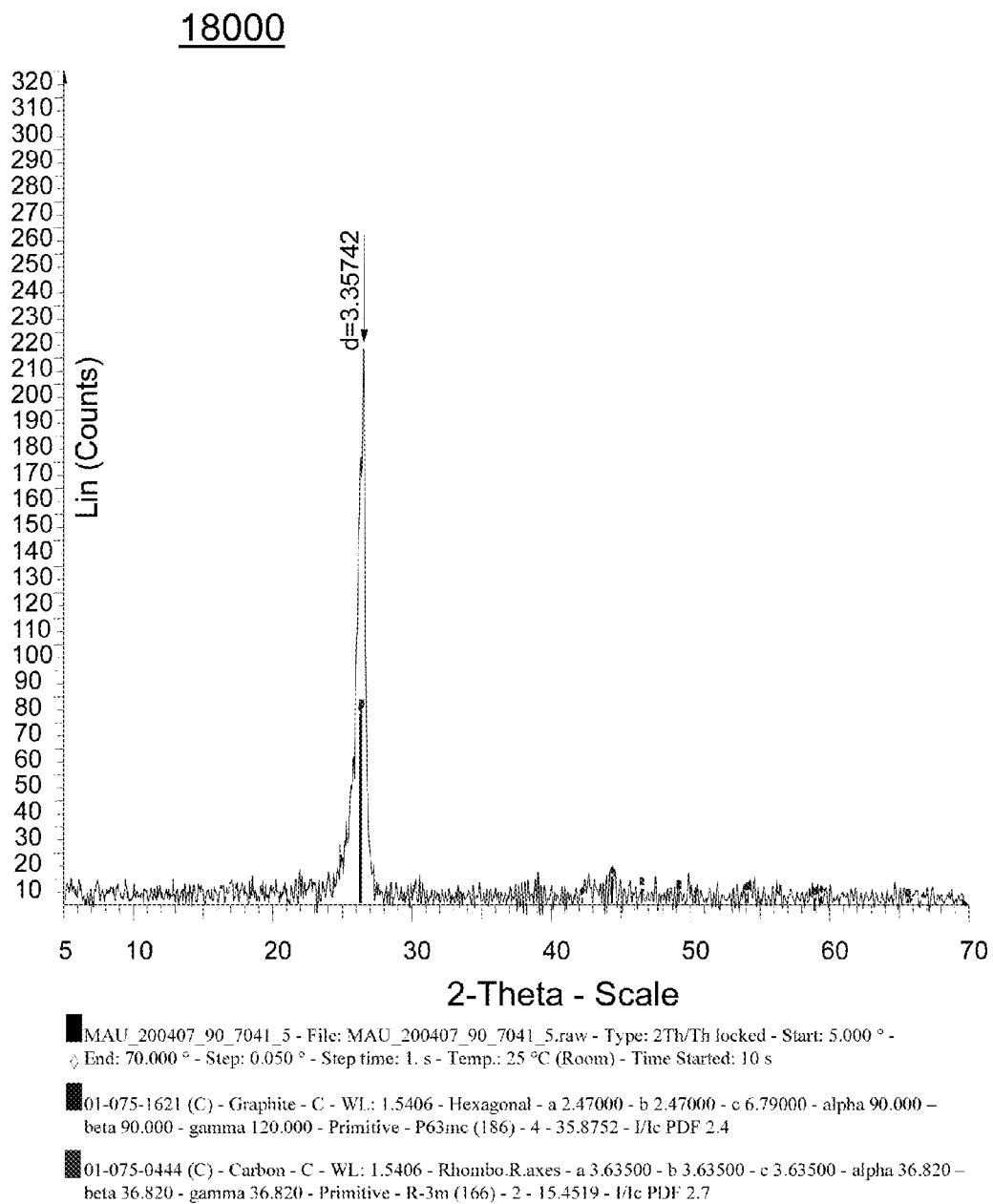
FIG. 18 is a graph 18000 of XRD spectroscopy results for an exemplary GHC product functionalized to carry an —SO3H functional group according to an exemplary embodiment.

FIG. 18 is a graph 18000 of XRD for an exemplary GHC product functionalized to carry —SO3H according to an exemplary embodiment.

Figure 19:
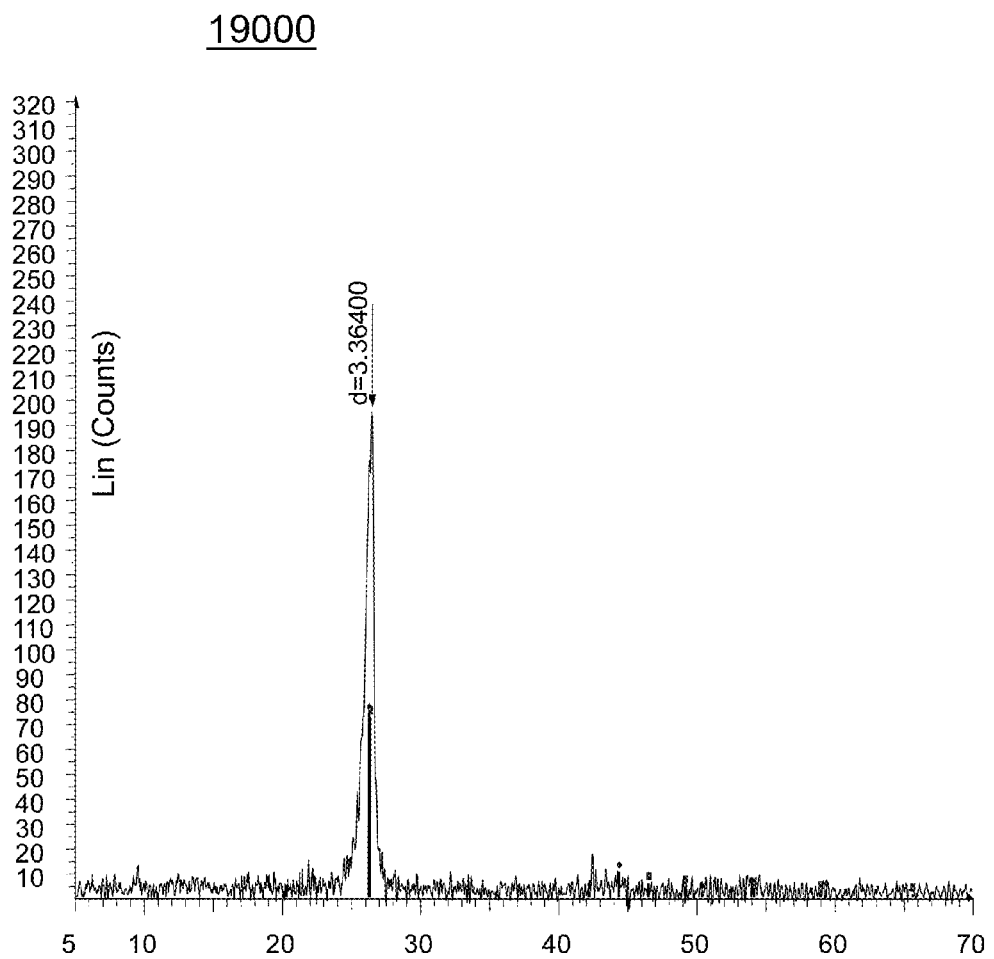
FIG. 19 is a graph 19000 of XRD spectroscopy results for an exemplary GHC product functionalized to carry a COOH functional group according to an exemplary embodiment.

FIG. 19 is a graph 19000 of XRD for an exemplary GHC product functionalized to carry —COOH according to an exemplary embodiment.

Figure 20:
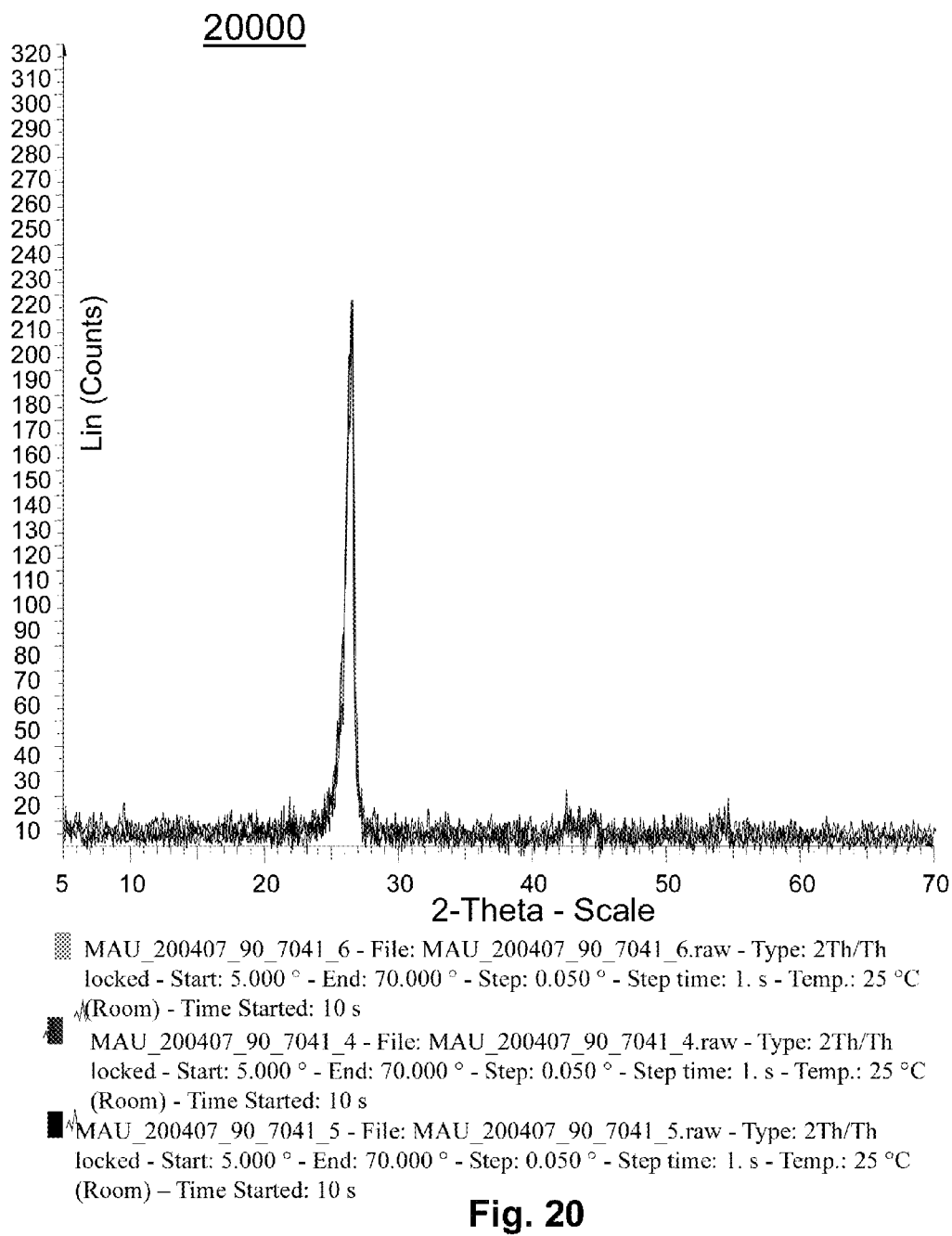
FIG. 20 is a graph 20000 of overlayed XRD spectroscopy results for exemplary GHC products according to the exemplary embodiments.

FIG. 20 is a graph 20000 of overlayed XRD for exemplary GHC products showing each GHC having substantially identical XRDs according to exemplary embodiments.

Figure 21:
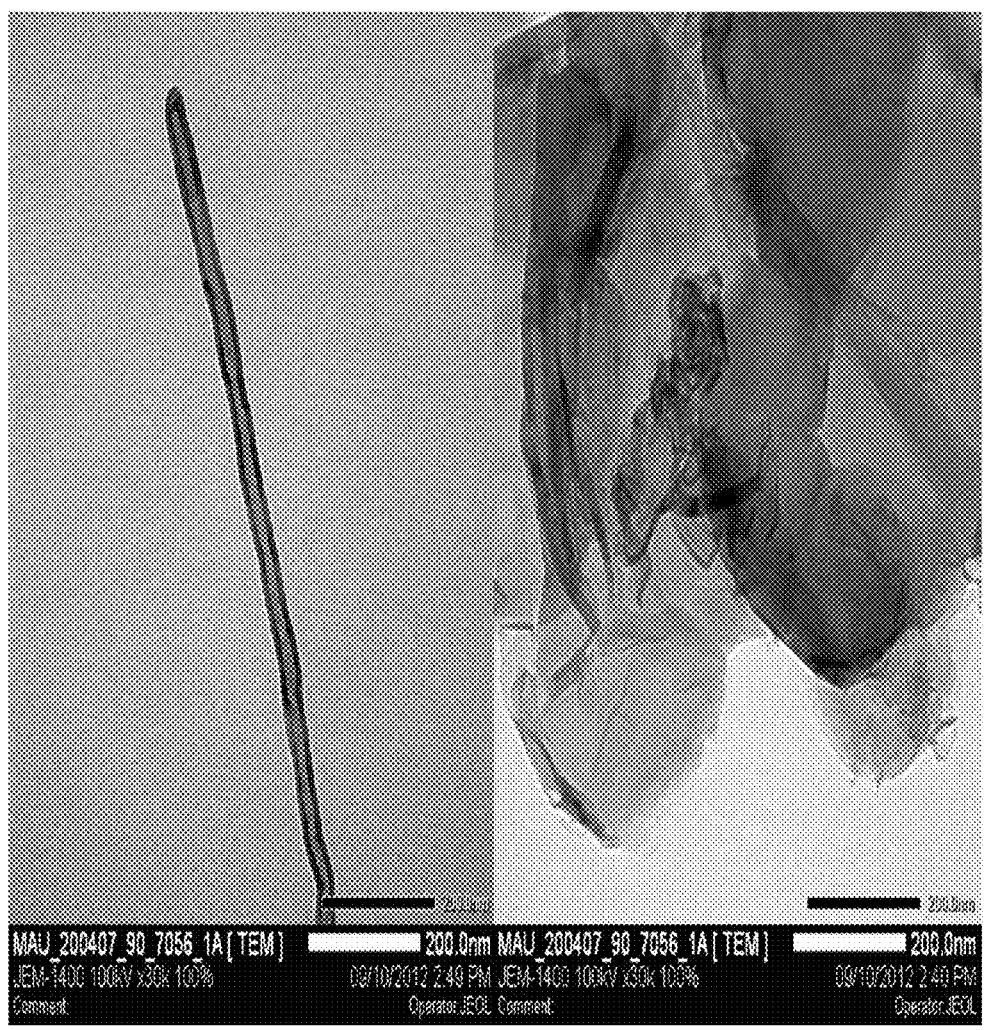
FIG. 21 is a graph 20000 of a transmission electron microscope ("TEM") image for an exemplary GHC product according to an exemplary embodiment, which illustrates a carbon nano tube (left) and flakes (right)

FIG. 21 is a graph 21000 of TEM image for exemplary GHC product. One can see that both carbon nano tube (left) and flakes (right) appeared in the sample GHC sample.

Figure 22:
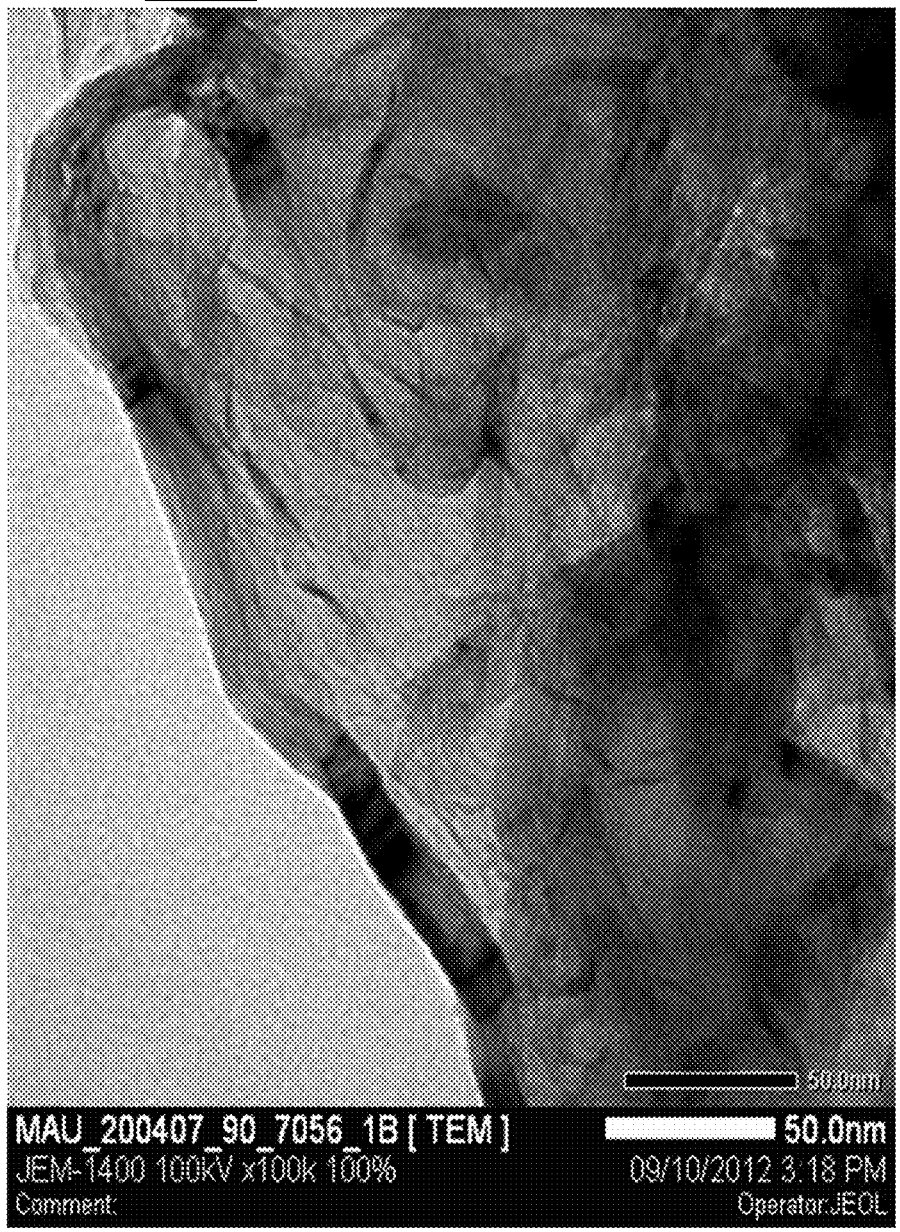
FIG. 22 is a graph 22000 of a TEM image for an exemplary GHC product according to an exemplary embodiment, which illustrates a carbon nano tube (left) and flakes (right)

FIG. 22 is a graph 22000 of TEM image for exemplary GHC product. One can see that both carbon nano tube (left) and flakes (right) appeared in the sample Certain exemplary embodiments can provide Raman spectroscopy shift appeared at approximately 1320 (1/cm) (D band), approximately 1575 (1/cm) (G band) and approximately 2650 (1/cm) (2D band).

Figure 23:
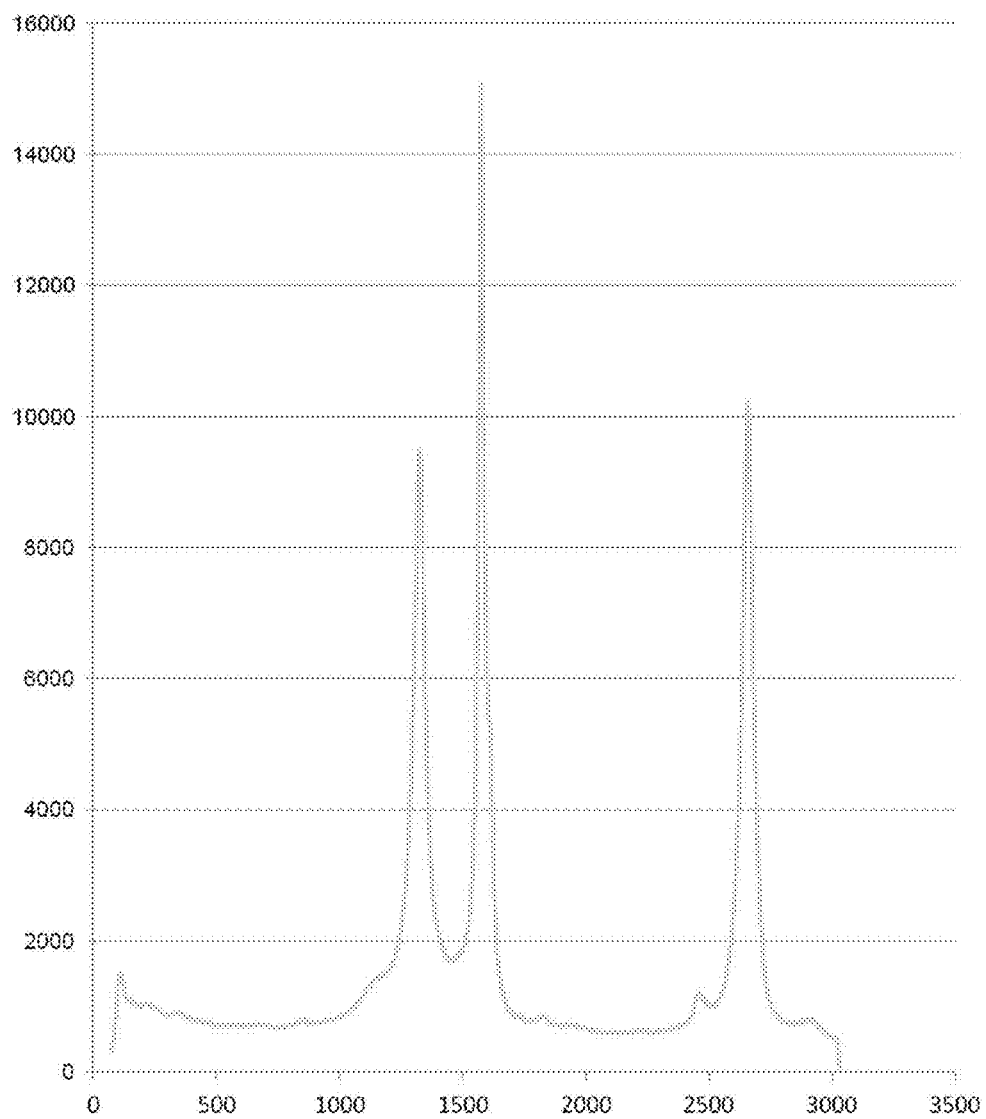
FIG. 23 is a graph 23000 of Raman spectroscopy results for an exemplary GHC product according to an exemplary embodiment.

FIG. 23 is a graph 23000 of Raman spectroscopy results for an exemplary GHC product according to an exemplary embodiment.

Figure 24:
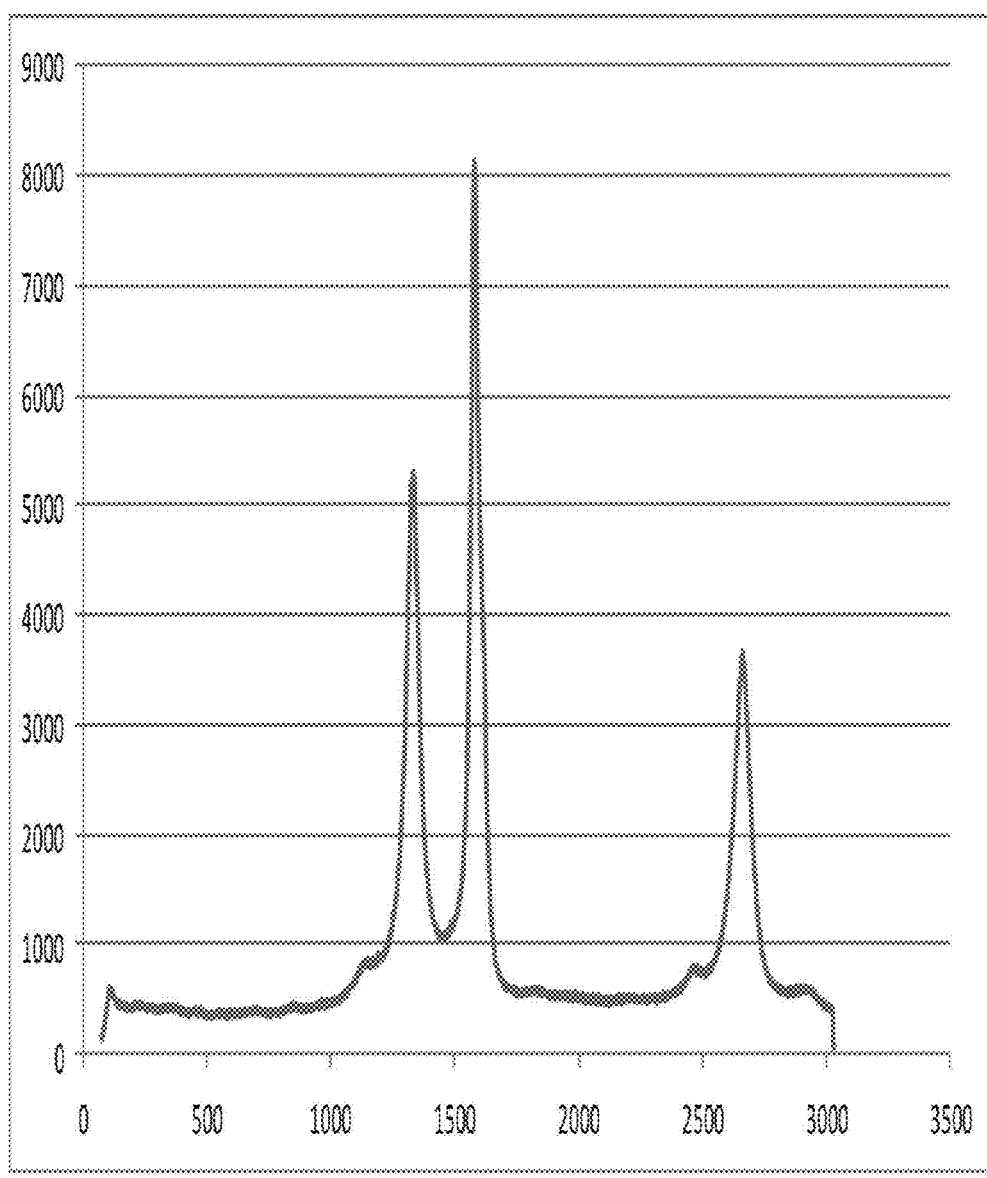
FIG. 24 is a graph 24000 of Raman spectroscopy results for an exemplary GHC product according to an exemplary embodiment.

FIG. 24 is a graph 24000 of Raman spectroscopy results for an exemplary GHC product according to an exemplary embodiment.

Figure 25:
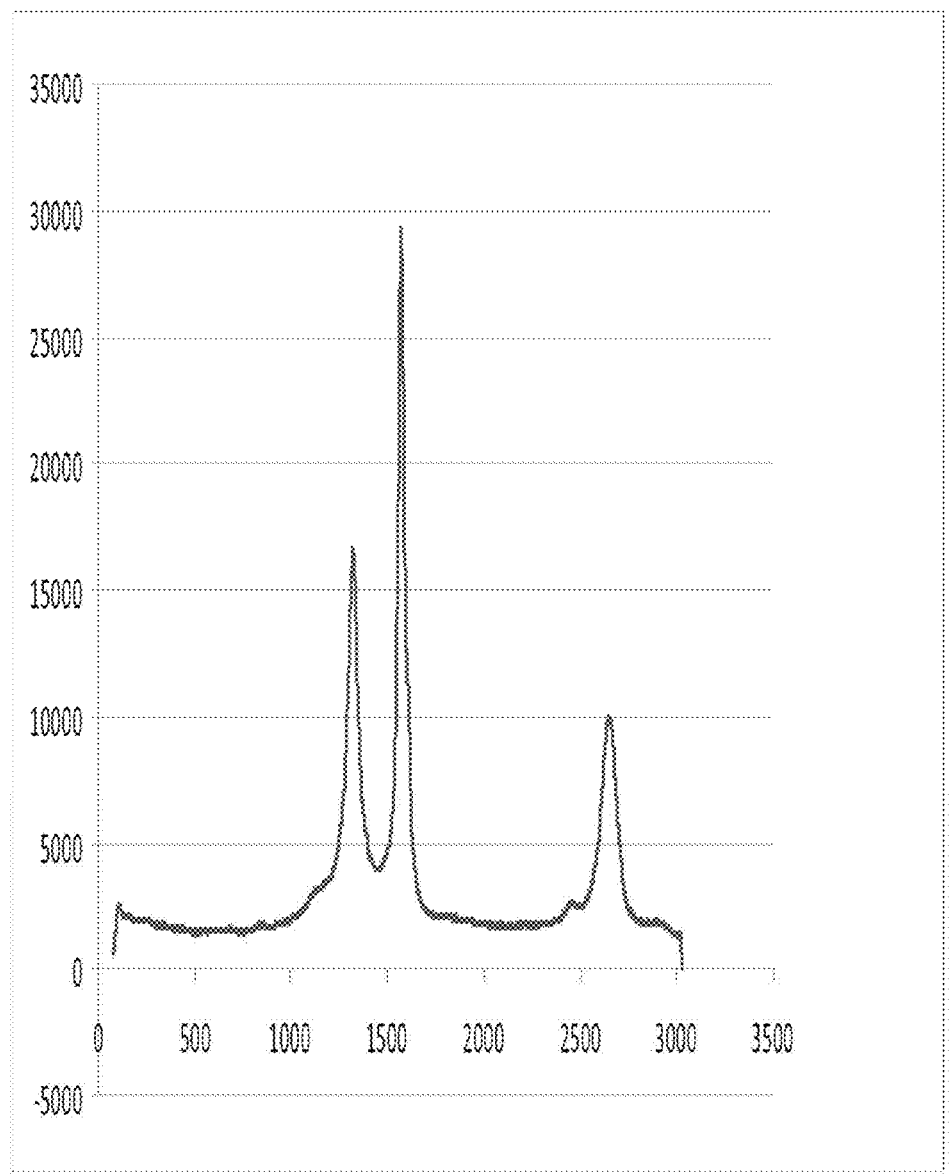
FIG. 25 is a graph 25000 of Raman spectroscopy results for an exemplary GHC product according to an exemplary embodiment having been oxidized with H2SO4/H3PO4.

FIG. 25 is a graph 25000 of Raman spectroscopy results for an exemplary GHC product according to an exemplary embodiment having been oxidized with $H_2SO_4/H_3PO_4$, ρ4=0.022.

Figure 26:
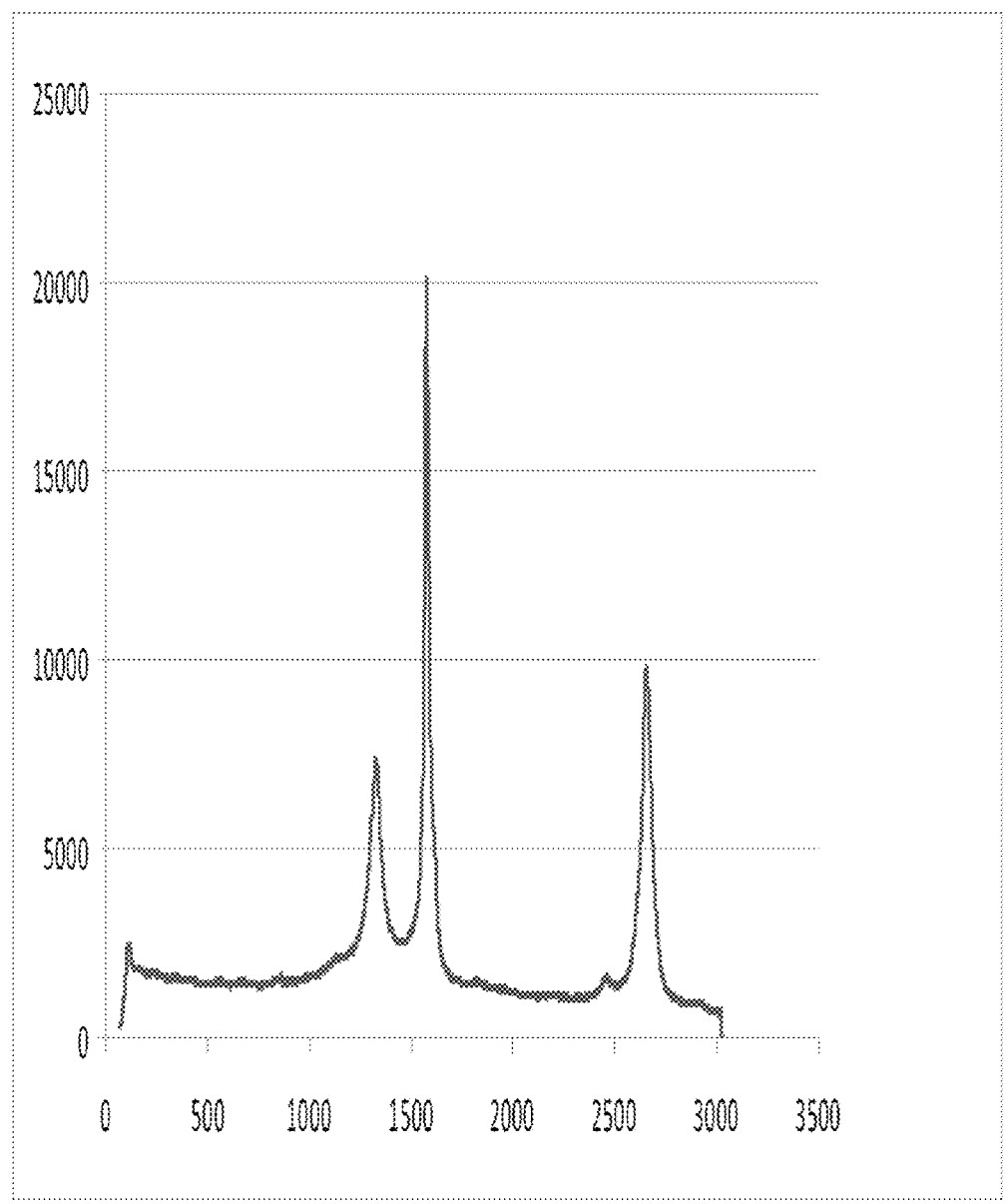
FIG. 26 is a graph 26000 of Raman spectroscopy results for an exemplary GHC product according to an exemplary embodiment having been subjected to diazotization.

FIG. 26 is a graph 26000 of Raman spectroscopy results for an exemplary GHC product according to an exemplary embodiment having been subjected to diazotization, ρ6=0.048, BA 0.3 mol.

Figure 27:
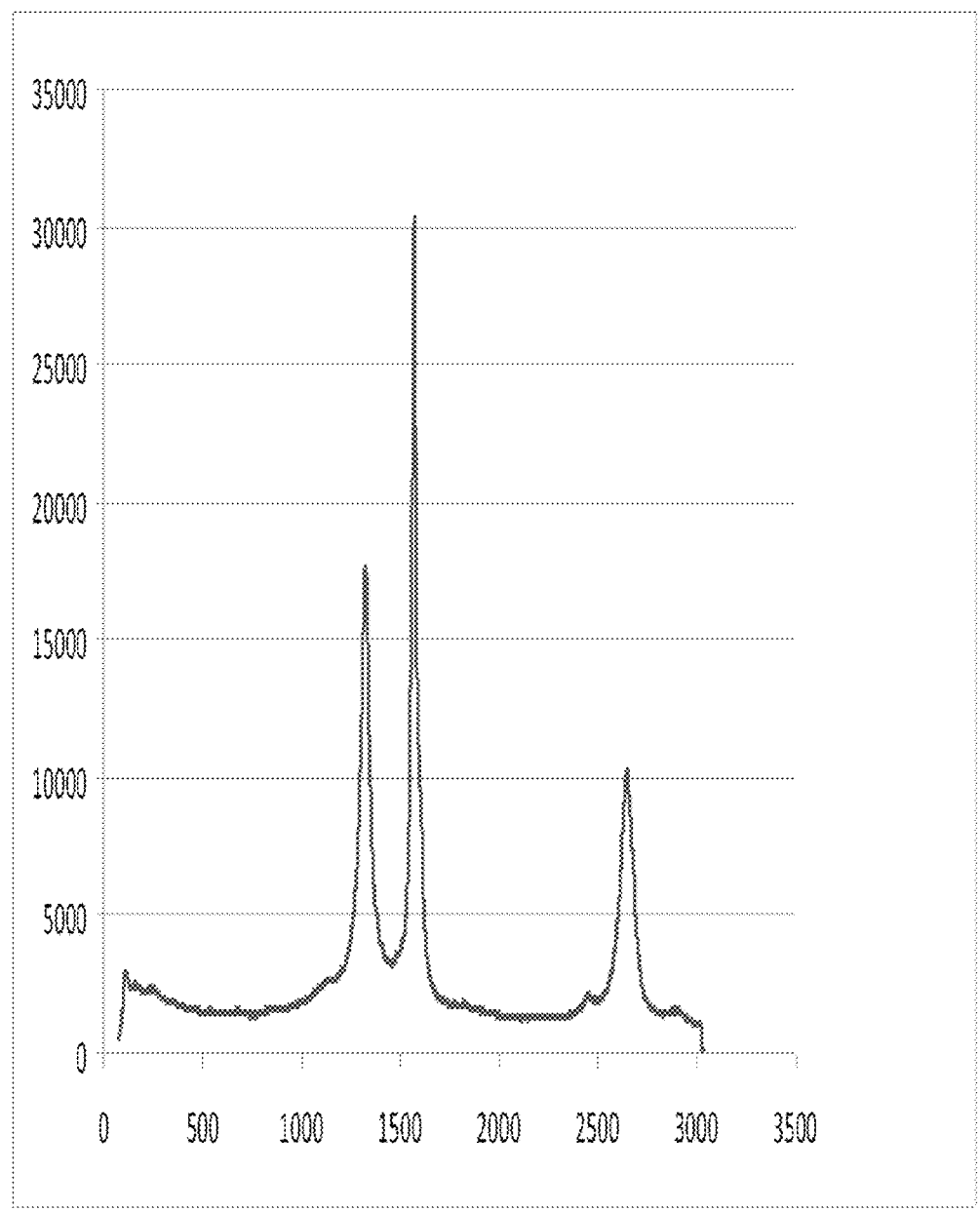
FIG. 27 is a graph 27000 of Raman spectroscopy results for an exemplary GHC product according to an exemplary embodiment having been oxidized with H2SO4 and KMnO4.

FIG. 27 is a graph 27000 of Raman spectroscopy results for an exemplary GHC product according to an exemplary embodiment having been oxidized with $H_2SO_4$ and $KMnO_4$, ρ4=0.03.

Figure 28:
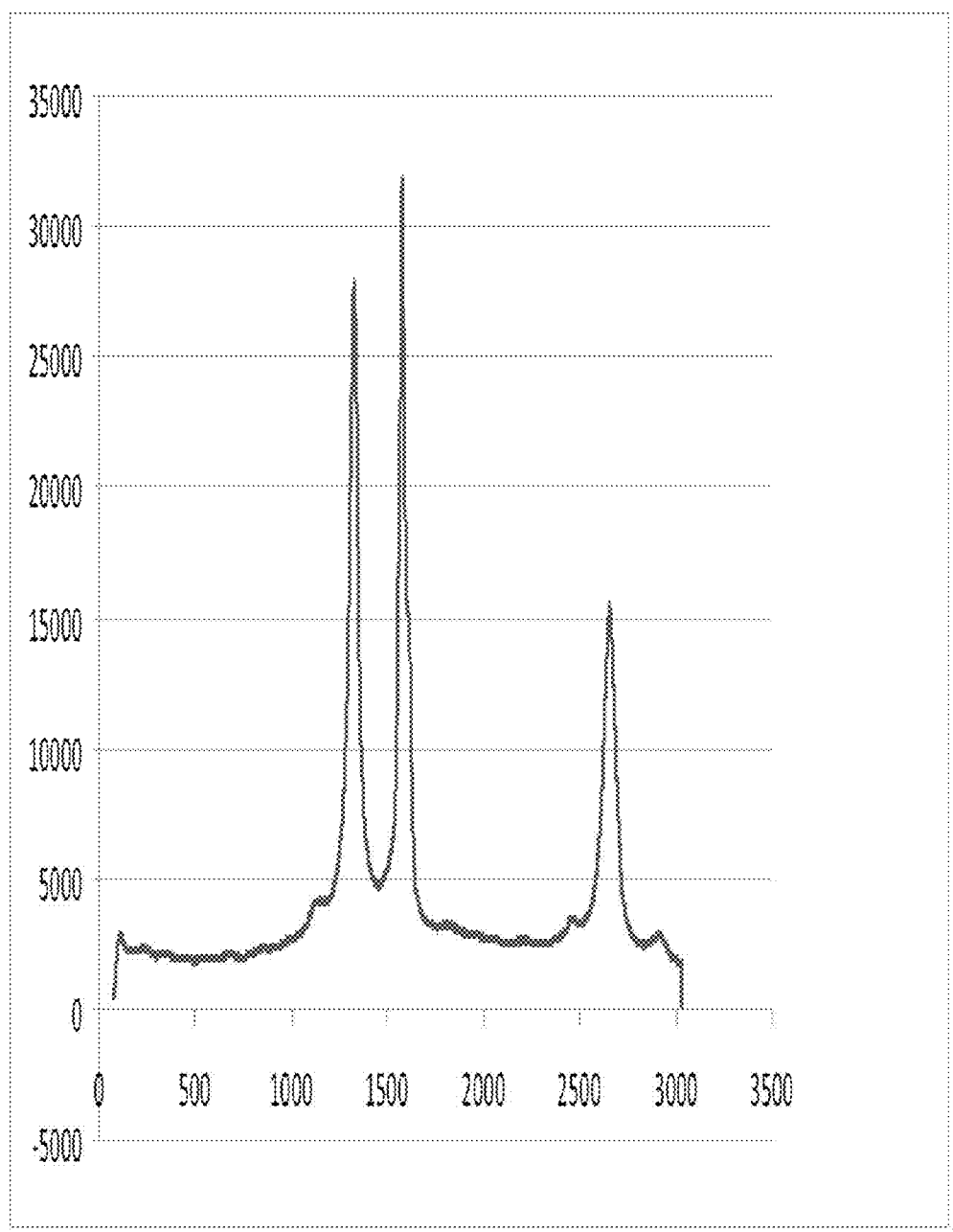
FIG. 28 is a graph 28000 of Raman spectroscopy results for an exemplary GHC product according to an exemplary embodiment.

FIG. 28 is a graph 28000 of Raman spectroscopy results for an exemplary GHC product according to an exemplary embodiment.

Figure 29:
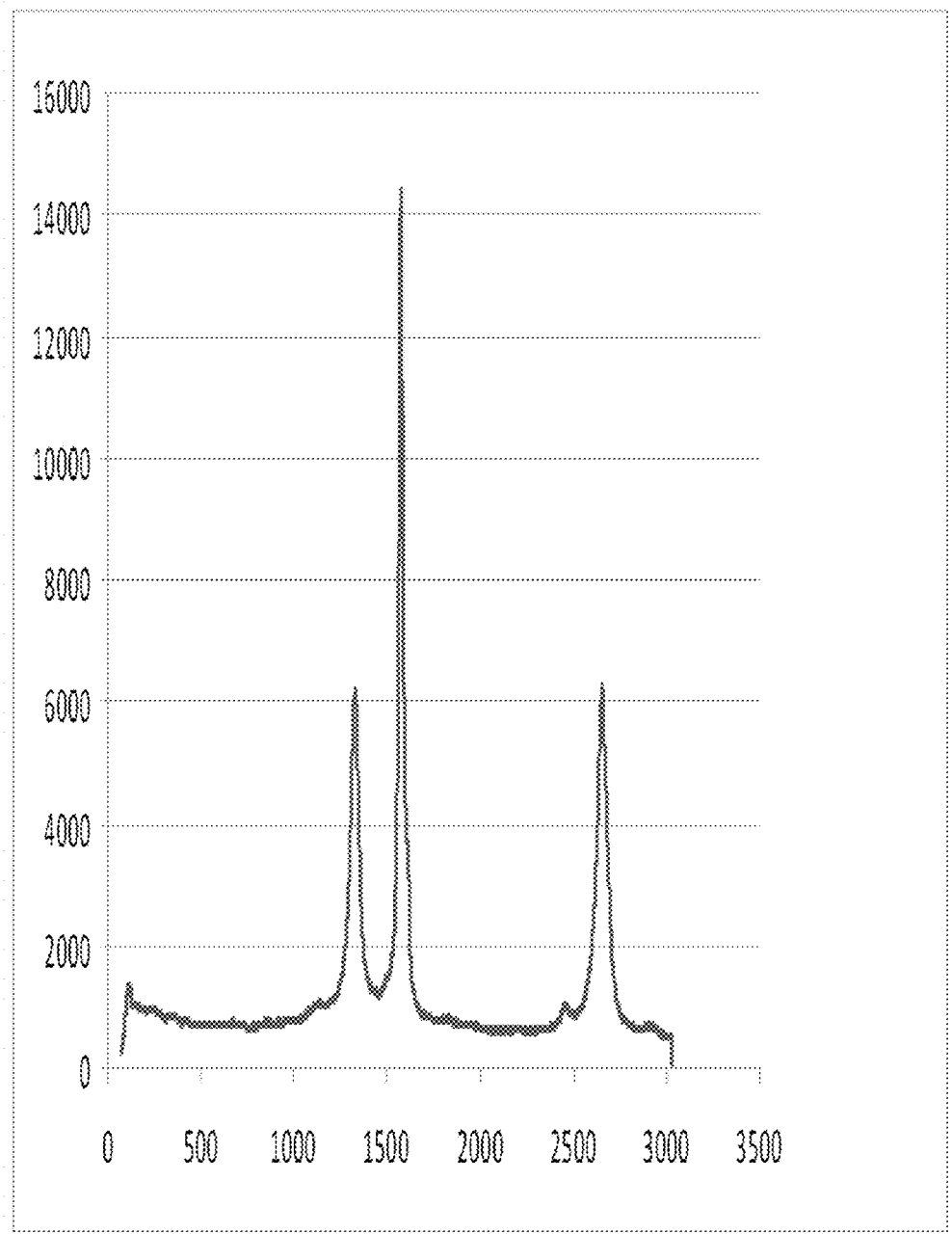
FIG. 29 is a graph 29000 of Raman spectroscopy results for an exemplary GHC product according to an exemplary embodiment.

FIG. 29 is a graph 29000 of Raman spectroscopy for an exemplary GHC product according to an exemplary embodiment.

The GHC can be functionalized by known process, for example, by the oxidation with ($KMnO_4/H_2SO_4$) or with ($H_2SO_4/H_3PO_4$) or $HNO_3$. The oxidized GHC can further react with other species to carry new functional groups such as —COOH, —SO3H, which allows GHC to become relatively well dispersed in aqueous media. The aqueous solution of functionalized GHC is substantially transparent and can form a film on a substantially transparent substrate such as glass and/or polymer, etc. The film forming properties of functionalized GHC can be enhanced by adding polymer into it. In such embodiments, the functionalized GHC still exhibits relatively high electrical conductivity and enhanced compatibility with various kinds of solvents and polymers over non functionalized GHC, substantially tubular shape nano carbon products, as well as relatively pure graphene nano platelets. In order to render the bulk electrical resistivity of functionalized GHC back to the original GHC, a technique such as hydrazine reduction and/or NaBH4 reduction can be utilized. However a transparent film comprising functionalized graphene or GHC can't be reduced in a wet process back into the original material without damage the physical structure of the film. In certain exemplary embodiments, the transparent film coated with functionalized GHC can be annealed in atmospheric gas at a temperature below approximately 600 degrees Celsius to increase back the original electrical conductivity.

A transparent conductor can be used in a touch panel, solar cell, light emitting diode ("LED"), and/or organic light emitting diode ("OLED"). The functionalized GHC can be dispersed in a binder which can be either polymer or glass. There are several ways to make a substantially transparent conductor film.

In certain exemplary embodiments, the functionalized GHC can be dispersed in certain kind of solvents, especially, hydroxylated solvents such as monoalcohol such as, but not limited to, hexanol, butanol, cyclohexanol, polyol including 1,5-pentane diol, and/or ethylene glycol, etc. In order to enhance the film forming properties, the electrical conductive element may contain polymer including electrical conductive polymer such as acrylonitrile butadiene styrene ("ABS") resin, tree rubber, light emitting polymer, hydroxylated polymer such as polyvinyl butyral, polyethylene glycol, polyvinylalcohol, crosslinking polymer, and/or polar functional groups such as:

COOH, —SO$_3$H, —OH, —SH, —CH$_2$OH, —CH$_2$CH$_2$-phenyl, —CONH, —CO, —CHO, —CN, —NO$_2$, —NR$_1$R$_2$ where R$_1$, R$_2$=H, alkyl, aryl, arylalkane with substitute groups; thermoset, polyamic and polyimide, the polymeric binder having thermographic decomposition temperature in the range between room temperature and approximately 400° C.

The polymeric binder can have a content from approximately 0% up to approximately 99.999% by weight In certain exemplary embodiments, the functionalized GHC can be dissolved in certain kind of solvent containing with and without polymeric additives.

The transparent conductive film can be cast from the dispersion of GHC, functionalized GHC, a solution of GHC, and/or functionalized GHC with and without polymeric binder. The casting of the film can be done by a number of different process including spin coating, dip coating, blade coating, spray coating, filter media coating, wound wire bar coating, and/or hopper coating, etc. The wet film can be dried via a baking process such as by using a convection process.

For the soluble GHC, the cast film can be thermally treated to increase electrical conductivity.

Using functionalized GHC, the electrical conductive element can be a liquid comprising liquid medium in which the functionalized GHC are dispersed, wherein the functionalized GHC occupy a proportion of at least approximately 0.001% by volume based on a total ink volume. In the case of liquid form, the electrical conductive element can also comprise a polymeric binder, nano metal, and/or surfactant, etc.

The functionalized GHC can be effective for electron producing catalysts, electro conductive applications such as conductive painting and lacquers, electromagnetic shielding, conductive inks, transparent conductors, touch panel, lithium battery electrode, super capacitor, electro conductive mechanical processing such as bipolar plates for hydrogen fuel cells, bio sensors, glucose meters, and/or alcohol detectors, etc.

Certain exemplary embodiments can provide an electrically conductive element comprising a graphene hybrid composite (GHC) embedded in a binder matrix comprising specific additives. The GHC can be formed between specific nano carbon materials and graphene generated via pyrolysis of solid carbon sources. An X-ray diffraction analysis of the GHC can show peaks at two theta values of approximately 26.5 degrees, approximately 42.5 degrees, and/or approximately 54.5 degrees. A Raman spectrum of the GHC can show a shift at approximately 1320 (1/centimeter) (D band), approximately 1575 (1/centimeter) (G band) and/or approximately 2650 (1/centimeter) (2D band). The GHC and/or the electrically conductive element can comprise one or more of SiO2, MnO, Mn2O3, Mn3O4, Al2O3, KCl, K, Na, and/or Al, etc. The GHC can comprise a nano metallic element. The GHC and/or the electrically conductive element can comprise magnetic nano particles. The GHC and/or the electrically conductive element can comprise one or more of —COOH, —SO$_3$H, —OH, —SH, —CH$_2$OH, —CH$_2$CH$_2$-phenyl, —CONH, —CO, —CHO, —CN, —NO$_2$, —NR$_1$R$_2$ where R1, R$_2$ are selected from H, alkyl, aryl, and arylalkane with substitute groups.

The binder matrix can comprise at least one of:
an electrically conductive polymer having at least one conjugate bond in a main chain or a side chain of the polymer;
a hydroxylated polymer;
a crosslinking polymer;
one or more of COOH, —SO$_3$H, —OH, —SH, —CH2OH, —CH$_2$CH$_2$-phenyl, —CONH, —CO, —CHO, —CN, —NO$_2$, —NR1R2 where R1, R2 are selected from H, alkyl, aryl, arylalkane with substitute groups;
an electrolytic polymer;
thermoset;
polyamic; and
a polyimide.

In certain exemplary embodiments, the binder matrix can be thermogravimetrically stable to a temperature of approximately 400 degrees Celsius. The binder matrix can be an inorganic glass with content from approximately 0% up to approximately 99.999% by weight. The binder matrix can be an inorganic ceramic with content from approximately 0% up to approximately 99.999% by weight. The specific additives can comprise at least one of:
charge transport molecules comprising of hole transport molecules, electron transport molecules, and charge transfer complex;
particles or nano particles of a metal, metal oxide, or semiconductor;
a surfactant;
a mineral;
a ferrofluid;
a magnetic nano particle;
a ferric oxide;
Co; and
Ni.

In certain exemplary embodiments, the specific additives can comprise a rare earth mineral additive. the specific additives can comprise a phosphorescent mineral. The specific additives can be minerals comprising at least one of Na, K, Al, SiO$_2$, TiO$_2$, In$_2$O$_3$, and SnO$_2$. The electrically conductive element can be used in a format of dry powder, paste, thin film, or liquid conductive ink. A thin film comprising the GHC and/or suitable additives can be deposited on glass, plastic, insulator, semiconductor, metal, or a wood substrate. The electrically conductive element can comprise a conductive ink that comprises a polymeric binder. The GHC can be dispersed or dissolved in solvents. The solvents can be hydroxylated and can comprise at least one fluorine atom. The polymeric binder can be thermogravimetrically stable to a temperature of approximately 400 degrees Celsius. The ink can have a concentration of the polymeric binder from between approximately zero percent and approximately 99.999 percent by weight in the ink. The polymeric binder of the ink can be selected from:

an electrical conductive polymer having at least one of a conjugate bond in main polymer chain or side polymer chain, a hydroxylated polymer, a crosslinking polymer;

a polymer having at least one of polar functional groups COOH, —SO$_3$H, —OH, —SH, —CH$_2$OH, —CH$_2$CH$_2$-phenyl, —CONH, —CO, —CHO, —CN, —NO$_2$, —NR1R2 where R1, R2 are selected from H, alkyl, aryl, and arylalkane with substitute groups;

a thermoset polymer;

a polyamic polymer; and polyimide polymer.

In certain exemplary embodiments, the electrical conductive element can be used in a digital printing ink. The digital printing ink can be adapted for use in at least one of digital fabrication, printed electronics, silk printing, and electroplating applications in semiconductor technology. The electrical conductive element can be used in an electrically conductive paint or lacquer, the electrically conductive paint or lacquer adapted for use in electromagnetic shielding. The electrical conductive element can be used in an electrically conductive paper. The electrical conductive element can be used in an electromagnetic ink, the electromagnetic ink adapted for use in magnetic ink character recognition. The electrical conductive element can be used in a transparent conductor application, a solar cell, and/or a touch panel. The electrical conductive element can be used in an energy storage device. The energy storage device can comprise a battery electrode, lithium battery, super capacitor, and/or a nano cable. The electrical conductive element can be used in a fuel cell application. The electrical conductive element is used in an electrically conductive molding, the electrically conductive molding adapted for use in at least one of a bipolar plate or electromagnetic shielding of a microwave oven.

In certain exemplary embodiments, the physically functionalized GHC can be used in a combination with lithium batteries such as lithium iron phosphate, lithium cobalt, and the like to enhance the lifetime as well as improving fast charging properties of the batteries in applications such as electric cars.

Figure 30:
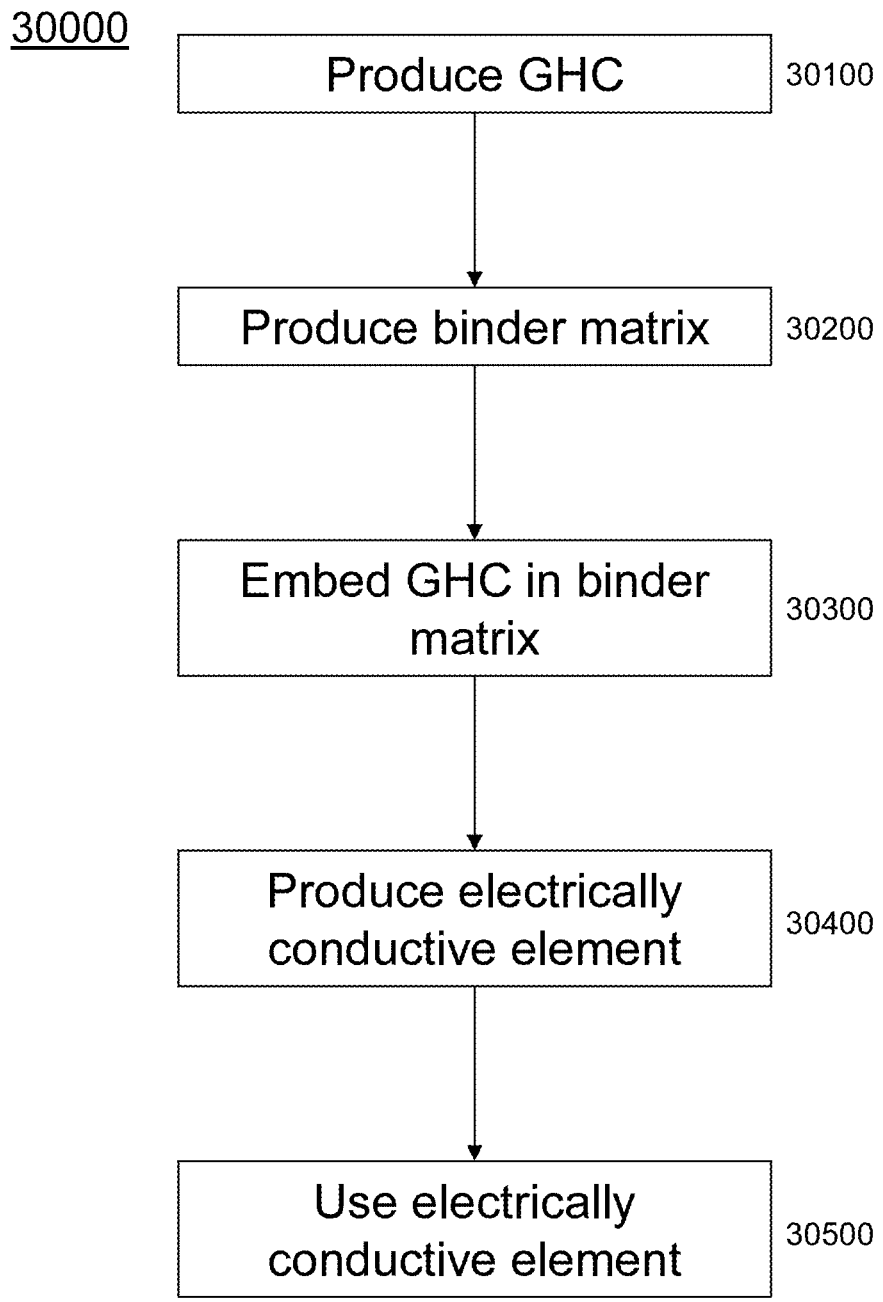
FIG. 30 is a flowchart of an exemplary embodiment of a method 30000.

FIG. 30 is a flowchart of an exemplary embodiment of a method 30000. At activity 30100, GHC can be produced. For example, the GHC can be produced according to a method disclosed in related U.S. patent application Ser. No. 13/290,108. The GHC can be comprised of tubular carbon and graphene produced via pyrolysis of a solid carbon source under an unoxidizing environment. When analyzed via X-ray diffraction, the GHC can generate peaks at two theta values of approximately 26.5 degrees, approximately 42.5 degrees, and/or approximately 54.5 degrees. A Raman spectrum of the GHC can show a shift at approximately 1320 cm$^{-1}$ (D band), approximately 1575 cm$^{-1}$ (G band) and/or approximately 2650 cm$^{-1}$ (2D band). The GHC can comprise one or more of SiO2, Al2O3, KCl, K, Na, and/or Al, etc. The GHC can comprise a nano metallic element. The GHC can comprise magnetic nano particles. The GHC can comprise one or more of —COOH, —SO$_3$H, —OH, —SH, —CH$_2$OH, —CH$_2$CH$_2$-phenyl, —CONH, —CO, —CHO, —CN, —NO2, —NR$_1$R$_2$ where R1, R$_2$ are selected from H, alkyl, aryl, and arylalkane with substitute groups.

At activity 30200, a binder matrix can be produced with specific additives. The binder matrix can comprise at least one of:

an electrically conductive polymer having at least one conjugate bond in a main chain or a side chain of the polymer;

a hydroxylated polymer;

a crosslinking polymer;

one or more of COOH, —SO$_3$H, —OH, —SH, —CH$_2$OH, —CH$_2$CH$_2$-phenyl, —CONH, —CO, —CHO, —CN, —NO$_2$, —NR1R2 where R1, R2 are selected from H, alkyl, aryl, arylalkane with substitute groups;

an electrolytic polymer;

thermoset;

polyamic; and a polyimide.

In certain exemplary embodiments, the binder matrix can be thermogravimetrically stable to a temperature of approximately 400 degrees Celsius. The binder matrix can be an inorganic glass with content from 0% up to 99.999% by weight. The specific additives can comprise at least one of:

charge transport molecules comprising of hole transport molecules, electron transport molecules, and charge transfer complex;

particles or nano particles of a metal, metal oxide, or semiconductor;

a surfactant;

a mineral;

a ferrofluid;

a magnetic nano particle;

a ferric oxide;

Co; and

Ni.

In certain exemplary embodiments, the specific additives can comprise a rare earth mineral additive. The specific additives can comprise a phosphorescent mineral. The specific additives can be minerals comprising at least one of Na, K, SiO$_2$, and TiO$_2$. The electrically conductive element can be used in a format of dry powder, paste, thin film, or liquid conductive ink. A thin film comprising the GHC can be deposited on glass, plastic, insulator, semiconductor, metal, or a wood substrate. The electrically conductive element can comprise a conductive ink that comprises a polymeric binder. The GHC can be dispersed or dissolved in solvents. The solvents can be hydroxylated and can comprise at least one fluorine atom. The polymeric binder can be thermogravimetrically stable to a temperature of approximately 400 degrees Celsius. The ink can have a concentration of the polymeric binder from between approximately zero percent and approximately 99.999 percent by weight in the ink. The polymeric binder of the ink can be selected from:

an electrical conductive polymer having at least one of a conjugate bond in main polymer chain or side polymer chain, a hydroxylated polymer, a crosslinking polymer;

a polymer having at least one of polar functional groups COOH, —SO$_3$H, —OH, —SH, —CH$_2$OH, —CH$_2$CH$_2$-phenyl, —CONH, —CO, —CHO, —CN, —NO$_2$, —NR1R2 where R1, R2 are selected from H, alkyl, aryl, and arylalkane with substitute groups;

a thermoset polymer;

a polyamic polymer; and polyimide polymer.

At activity 30300, the GHC can be embedded in the binder matrix. At activity 30400, an electrically conductive element can be produced.

At activity 30500, the electrically conductive element can be used. In certain exemplary embodiments, the electrical conductive element can be used in a digital printing ink. The digital printing ink can be adapted for use in at least one of digital fabrication, printed electronics, silk printing, and electroplating applications in semiconductor technology. The electrical conductive element can be used in an electrically conductive paint or lacquer, the electrically conductive paint or lacquer adapted for use in electromagnetic shielding. The electrical conductive element can be used in an electrically conductive paper. The electrical conductive element can be used in an electromagnetic ink, the electromagnetic ink adapted for use in magnetic ink character recognition. The electrical conductive element can be used in a transparent conductor application. The electrical conductive element can be used in an energy storage device. The energy storage device can comprise a battery electrode, lithium battery, super capacitor, and/or a nano cable. The electrical conductive element can be used in a fuel cell application. The electrical conductive element is used in an electrically conductive molding, the electrically conductive molding adapted for use in at least one of a bipolar plate or electromagnetic shielding of a microwave oven.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

$\rho$—bulk electrical resistivity.

2D band—a peak on a Raman shift spectrum at approximately 2650 cm$^{-1}$.

a—at least one.

activity—an action, act, step, and/or process or portion thereof adapted to—made suitable or fit for a specific use or situation.

additive—a substance added to something that alters the properties of the something.

adsorb—to adhere to a surface.

aerogel—a synthetic porous ultralight material derived from a gel, in which a liquid component of the gel has been replaced with a gas.

and/or—either in conjunction with or in alternative to.

apparatus—an appliance or device for a particular purpose.

application—a use or purpose to which something is put.

battery—one or more electrochemical cells adapted to convert stored chemical energy into electrical energy.

binder—a substance that causes cohesion between other substances in a system.

biomedical—relating to both biology and medicine.

bipolar plate—conductive plate in a fuel cell stack that acts as an anode for one cell and a cathode for an adjacent cell. The plate can comprise a metal or a conductive polymer (which can be a carbon-filled composite).

blend—to mix together.

bond—a cohesive adhesion of substances.

can—is capable of, in at least some embodiments.

carbon nanofiber—a substantially cylindrical nano structure with graphene layers arranged as stacked cones, cups, or plates.

carbon nanorod—a nanocrystalline form of diamond.

carbon nanotube—a carbon nano fiber comprising graphene layers wrapped into substantially perfect cylinders.

carbon nanowires—a nanostructure comprising carbon and having a diameter of approximately a nanometer (10$^{-9}$ meters) and in which electrons are quantum confined laterally.

ceramic—an inorganic, nonmetallic solid.

character recognition—an identification by electronic means of printed or written characters.

charge transport molecules—a group of atoms, bonded together, which are capable of conducting an electrical charge, via electrons or holes, responsive to an application of an electrical potential.

chemical stability—adapted to maintain a present chemical composition at ambient temperatures and pressures in open air.

composite—a combined plurality of component parts.

comprising—including but not limited to.

conduct—to transmit electrical energy.

conductive—adapted to transmit electrical energy.

conjugate—two or more alternating double chemical bonds in a system.

crosslink—a bond, atom, or group linking the chains of atoms in a polymer, protein, or other complex organic molecule.

D band—a peak on a Raman shift spectrum at approximately 1350 cm$^{-1}$.

device—a machine, manufacture, and/or collection thereof digital fabrication—computer controlled manufacture.

digital printing ink—an ink adapted for use in printing from a digital based image directly to a variety of media.

disperse—to cause particles to separate uniformly throughout a substance.

dissolve—to cause a solute to be mixed with a liquid solvent.

dry powder—a substantially water free solid that has a maximum particle diameter that is less than approximately 100 microns.

electrically conductive—having an electrical conductivity that is greater than approximately 1,000 Siemens/meter.

electrode—an electrical conductor through which a current enters or leaves a nonmetallic medium, as an electrolytic cell, arc generator, vacuum tube, or gaseous discharge tube.

electrolytic polymer—a polymer which can transportions; an electrically conductive or semiconductive polymer.

electromagnetic—capable of being magnetized by via an electric current in a surrounding coil.

electromagnetic shielding—a barrier, made of conductive and/or magnetic materials, adapted to reduce an electromagnetic field in a space by blocking the field.

electron transport molecules—a group of atoms, bonded together, which are capable of conducting an electrical charge, via electrons, responsive to an application of an electrical potential.

electroplate—to plate or coat with a metal by electrolysis.

electro catalyst—a substance that participates in an electrochemical reaction by modifying or increasing a chemical reaction rate substantially without being consumed in the chemical reaction.

element—a component or constituent of a whole device or system.

energy storage—a repository adapted to contain reserves having a capacity of a body or system to do work.
form—to bring together components to create something.
ferrofluid—a liquid which becomes strongly magnetized in the presence of a magnetic field.
flake—a substantially planar lattice of carbon atoms.
fuel cell—a system adapted to convert chemical energy from a fuel into electricity through a chemical reaction with oxygen or another oxidizing agent.
functional group—a group of atoms responsible for the characteristic behavior of the class of compounds in which the group occurs.
G band—a peak on a Raman shift spectrum at approximately 1575 $cm^{-1}$.
generate—to produce.
glass—a hard brittle non-crystalline solid comprising a fused mixture of oxides.
graphene—an allotrope of carbon having a structure of approximately one-atom-thick planar sheets of sp2-bonded carbon atoms in a honeycomb crystal lattice.
graphene hybrid composite—a substance comprising graphene as described in pending U.S. patent application Ser. No. 13/290,108, filed 7 Nov. 2011.
graphite—a hexagonally crystallized allotrope of carbon.
heating element—a device or system adapted to increase a temperature of a substance.
hole transport molecules—a group of atoms, bonded together, which are capable of conducting an electrical charge, via hole, responsive to an application of an electrical potential.
hybrid composite—a material comprising two constituents at the nanometer or molecular level.
hydroxylate—to introduce a hydroxyl group (—OH) into an organic compound.
infra-red heater—a device or system adapted to increase a temperature of a substance via electromagnetic radiation in a range between approximately 780 nanometers to approximately 1 millimeter.
ink—a liquid or paste that contains pigments and/or dyes adapted to produce electrically conductive patterns when used in a suitable system.
inorganic—pertaining to chemical compounds that are not hydrocarbons or derivatives thereof
insulator—a material in which internal electric charges do not flow freely, and which therefore substantially does not conduct an electric current under the influence of an electric field.
intensity ratio—a magnitude of a first peak height divided by the magnitude of a second peak height on a Raman Spectrum.
iron relative—a compound comprising at least one of iron inorganic salts, iron organic salts, iron chelates, iron organo metallic compounds.
lacquer—a varnish that dries by solvent evaporation and/or a curing process to produce a relatively durable finish.
left stilt—allowed to remain substantially without any shaking or agitating.
light emitting diode—a semi-conductor adapted to produce light by a solid state process called electroluminescence.
liquid—a state of matter that occupies a substantially fixed volume but has no fixed shape.
lithium battery—a rechargeable battery in which lithium ions move between the anode and the cathode, using an intercalated lithium compound as the electrode material instead of the metallic lithium used in batteries comprising lithium that not adapted to be recharged.
matrix—a material in which other substances are embedded.
may—is allowed and/or permitted to, in at least some embodiments.
main chain—a longest contiguous series of carbon atoms or groups bonded together in an organic molecule.
mechanical stability—adapted to maintain physical properties and dimensions at ambient temperatures and pressures in open air.
metal—any of a number of chemical elements, such as iron or copper that are often lustrous ductile solids, have basic oxides, form positive ions, and are relatively good conductors of heat and electricity.
metal oxide—a metal that has been chemically bonded to, and which shares electrons with, an oxygen atom.
method—a process, procedure, and/or collection of related activities for accomplishing something.
microwave oven—an electrically operated system that comprises a chamber or compartment adapted to retain and heat substances; the system uses high-frequency electromagnetic waves that penetrate the substances, causing molecules of the substances to vibrate and generate heat.
mineral—any of a class of substances occurring in nature, usually comprising inorganic substances of definite chemical composition and usually of definite crystal structure, but sometimes also including rocks formed by these substances as well as certain natural products of organic origin, as asphalt or coal.
mold—a hollow form or matrix for giving a particular shape to something in a molten or plastic state.
nano cable—plastic tube comprising a novel nano material powder inside.
nano carbon—carbon materials having average particle size less than approximately 100 nanometers in size, carbon-based materials that can be bonded at the molecular level in differing ways to achieve unique properties, which comprise nanotubes, buckytubes, and/or fullerenes, etc.
nano carbon material—a structure comprising carbon that has a maximum size of one tenth of a micrometer in at least one dimension.
nano metallic element—a part of a nano carbon material that comprises at least on atom of a metal.
nano particle—an object having a maximum dimension of approximately 10,000 nanometers that behaves as a whole unit with respect to its transport and properties.
nano-platelets—nanoparticles comprising stacks of graphene that are 1 to 15 nanometers thick, with diameters ranging from sub-micrometer to 100 micrometers.
nano rod—a nanocrystalline form of carbon having rod shape in nano scale (less than 100 nanometers).
nano-tube—a nanocrystalline form of carbon having an at least partial hollow rod shape in nano scale (less than 100 nanometers).
nano wire—a nanostructure having a diameter of less than 100 nm and length less than approximately 100 nanometers. Si nano wire, carbon nano wire, ZnO nano rod are examples of nano wire and in which electrons are quantum confined laterally.
NTL—particular polymeric additives.
obtain—to come into possession of get, acquire, and/or procure.
organo clay—a
oven—a chamber used adapted for heating a substance.

oxide—a chemical compound that contains at least one oxygen atom in its chemical formula.

paper—a thin, flexible, and substantially planar material produced by pressing together moist fibers and drying them into flexible sheets.

particle—a small piece of matter.

paste—a mixture or material that is malleable.

peak—a sharp increase in a spectral plot followed by a sharp decrease.

phosphorescent—having a property of being luminous at temperatures below incandescence.

physically functionalized—formed in a reactor chamber substantially without chemical reactions taking place in the reactor chamber during formation.

plasma heater—a device or system adapted to increase in temperature responsive to passing an electric current through an ionized gas comprising positive ions and free electrons.

plastic—any one of a large number of synthetic, usually organic, materials that have a polymeric structure and can be shaped when soft and then hardened.

polar—being or having a molecule in which there is an uneven distribution of electrons and thus a dipole moment.

polyamic—an organic molecule having a plurality of amide functional groups.

polyimide—an organic molecule having a plurality of imide functional groups.

polymer—a macromolecule comprising repeating structural subunits that are typically connected by covalent chemical bonds.

powder—fine particles having a maximum particle size of approximately 10 microns.

power generator—a system adapted to generate electrical power from other sources of primary energy such as, for example, hydrogen.

present—being in a specified thing.

printed electronics—components produced via a method wherein electrically functional electronic or optical inks are deposited on the substrate, to create active or passive devices, such as thin film transistors or resistors.

produce—to make or manufacture.

provide—to furnish, supply, give, and/or make available.

pyrolyze—to thermochemically decompose an organic material at a temperature above approximately 200 degrees Celsius in the substantial absence of oxygen.

pyrolysis—a thermochemical decomposition of organic material at a temperature above approximately 200 degrees Celsius in the substantial absence of oxygen.

Raman spectroscopy—a spectroscopic technique used to observe vibrational, rotational, and other low-frequency modes in a system. The spectroscopic technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. The shift in energy gives information about the vibrational modes in the system.

Raman spectrum—a result of Raman Spectroscopy.

rare earth element—one of the fifteen lanthanides, scandium, or yttrium.

rare earth mineral—a mineral which comprises, as a major constituent, one or more rare earth elements.

reaction precursor agitation mechanism—a process that comprises mechanical mixing of two or more substances.

reactor—a vessel in which a chemical reaction takes place.

resistance heater—a device or system adapted to increase temperature responsive to passing an electric current through an electrical resistance.

semi-conducting—having a conductivity roughly in the range of $10^3$ to $10^{-8}$ siemens per centimeter.

side chain—a chemical group that is attached to a core part of the molecule called "main chain" or backbone. The placeholder R is often used as a generic placeholder for alkyl (saturated hydrocarbon) group side chains in chemical structure diagrams. To indicate other non-carbon groups in structure diagrams, X, Y, or Z is often used.

silk printing—a printing technique that uses a silk material to support an ink-blocking stencil. The stencil forms open areas of the silk that transfer ink or other printable materials which can be pressed through the silk as a sharp-edged image onto a substrate. A blade is moved across the screen stencil, forcing or pumping ink into the mesh openings for transfer by capillary action.

solid carbon source—an organic substance that is in a physical state in which it resists changes in size and shape.

solvent—a substance adapted to dissolves another solid, liquid, or gaseous solute.

specific—particular, or definite.

substantially—to a great extent or degree.

substitute groups—a group of atoms that can react with an organic molecule to replace an existing atom or group of atoms in the organic molecule.

super capacitor—an electrochemical capacitor that lacks a dielectric, the capacitance value of which is determined by (1) electrostatic storage of electrical energy within Helmholtz double layers achieved on a phase interface between the surface of electrodes and an electrolyte; and (2) electrochemical storage of electrical energy achieved by a faradaic electron charge-transfer by peculiar adsorbed ions with redox reactions.

surfactant—a substance adapted to reduce the surface tension of a liquid.

system—a collection of mechanisms, devices, machines, articles of manufacture, processes, data, and/or instructions, the collection designed to perform one or more specific functions.

technology—the application of practical sciences to industry or commerce.

thermogravimetrically stable—substantially not changing in weight responsive to a change in temperature over a predetermined range.

thermoset—having the property of becoming permanently hard and rigid when heated or cured.

thin film—a layer of material ranging from fractions of a nanometer to several micrometers in thickness.

transistor—a semiconductor device comprising at least three terminals and adapted to amplify and/or switch electronic signals and power.

transparent conductor—an electrically conductive material that is substantially optically transparent.

tubular—having a substantially cylindrical shape.

two theta values—detected intensities of an X-ray beam at a given detector swing angle (the detector swing angle of an X-ray diffraction system is defined as "two theta").

unoxidizing—substantially lacking chemical substances adapted to increase the positive charge or valence of a substance by attracting and/or removing electrons.

vehicle—a mobile machine that transports passengers or cargo. Examples of vehicles are bicycles, cars, trucks, buses, motorcycles, trains, ships, boats and aircraft, etc. Certain exemplary vehicles can be powered via electricity (e.g., electric cars).

via—by way of and/or utilizing.

waste gas exhaustion mechanism—a process that utilizes products of combustion of hydrocarbons.

wood—xylem.

X-ray diffraction—a substantially non-destructive analytical technique adapted to determine information about crystallographic structure, chemical composition, and/or physical properties of materials based on detecting reflected intensities of X-ray beams at predetermined angels of incidence (theta).

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. An electrically conductive element comprising:
   a physically functionalized graphene hybrid composite (GHC), wherein said physically functionalized GHC:
      said physically functionalized GHC is a formed composite of more than one kind of graphitic carbons comprising carbon nano-tube, graphite, graphene, graphene oxide, amorphous carbon created via pyrolysis of a combination of solid carbon sources with specific additives under unoxidizing environment; and
      is a powder comprising particles having average diameter less than 10 nanometers; and
      when analyzed via Raman spectroscopy:
         shows a major 2D band at approximately 2650 $cm^{-1}$;
         shows a minor D and G band at approximately 1350 $cm^{-1}$ and approximately 1575 $cm^{-1}$; and
         shows an intensity ratio of 2D band over D band and G band greater than 1.

2. The electrically conductive element of claim 1, wherein:
   a reactor forming said physically functionalized GHC generates free radicals via at least one of a carbon generator, waste gas exhaustion mechanism, or reaction precursor agitation mechanism.

3. The electrically conductive element of claim 1, wherein:
   a carbon generator generates free radicals utilizing a heating element comprising at least one of an infra-red heater, plasma heater, or resistor heater.

4. The electrically conductive element of claim 1, wherein:
   a reactor manufacturing said physically functionalized GHC is at least one of a vertical, horizontal, round bottom flask, or irregular shape.

5. The electrically conductive element of claim 1, wherein:
   said physically functionalized GHC is used with a specific chemical reagent to enhance electrically conductivity as well as chemical and mechanical stability; wherein said specific chemical reagent is a reduction agent; wherein said reduction agent comprises at least one of a metal hydride, $NaBH_4$, hydrazine, NaOH, KOH, $Na_2SiO_3$, sodium, or potassium.

6. The electrically conductive element of claim 1, wherein:

said electrical conductive element comprises at least one of a binder, electrical conductive nano materials comprising nano metals, nano wire, nano rod of metals and semiconductors, nano graphitic carbons comprising fullerene, diamond, carbon nano tube, graphene, or graphite.

7. The electrically conductive element of claim 1, wherein:
said electrical conductive element comprises a binder, wherein said binder is a polymeric binder, glass binder, ceramic binder, or metallic binder.

8. The electrically conductive element of claim 1, wherein:
said electrical conductive element comprises a binder, wherein said binder is a polymeric binder comprises at least one of an electrical conductive polymer, non-conducting polymer, thermos et polymer, cross linking polymer, emulsion polymer, electrolyte or electrolytic polymer, water soluble polymer, or a poly amino acid.

9. The electrically conductive element of claim 1, wherein:
said electrical conductive element comprises a binder, wherein said binder comprises at least one of $SiO_2$, $TiO_2$, $ZnO$, $MnO$, $Mn_2O_3$, $Mn_3O_4$, $Al_2O_3$, or KCL.

10. The electrically conductive element of claim 1, wherein:
said electrical conductive element is comprised by a substantially transparent conductor.

11. The electrically conductive element of claim 1, wherein:
said electrical conductive element is comprised by a conductive ink, lacquer, or adhesive.

12. The electrically conductive element of claim 1, wherein:
said electrical conductive element is comprised by a highly conductive film for applications such as replacing film prepared by vacuum technique for cost reduction.

13. The electrically conductive element of claim 1, wherein:
said electrical conductive element is comprised by a conducting powder for energy storage, nano cable, or super capacitor.

14. The electrically conductive element of claim 1, wherein:
said electrical conductive element is comprised by an energy conversion system or a solar cell.

15. The electrically conductive element of claim 1, wherein:
said electrical conductive element is comprised by an electro catalyst.

16. The electrically conductive element of claim 1, wherein:
said electrical conductive element is comprised by a biomedical system.

17. The electrically conductive element of claim 1, wherein:
said electrical conductive element and physically functionalized GHC is comprised by a power generator for a vehicle, said vehicle comprising a lithium battery.

18. The electrically conductive element of claim 1, wherein:
said electrical conductive element is comprised by a mechanical strength enhancement composite, an electro conductive ceramic composite, or an alloy between said physically functionalized GHC with nano metals.

19. The electrically conductive element of claim 1, wherein:
said physically functionalized GHC is combined with a specific chemical agent in a high mechanical strength electrical conductive element.

20. The electrically conductive element of claim 1, wherein:
said physically functionalized GHC is combined with a specific chemical agent and at least one of binder, reinforced materials comprising ceramic, aerogel, organo clays in a high mechanical strength electrical conductive element.

* * * * *